US012727070B2

(12) United States Patent

Liu et al.

(10) Patent No.: US 12,727,070 B2
(45) Date of Patent: Sep. 1, 2026

(54) LIGHT SOURCE DRIVE SYSTEM AND FAILURE REPORTING METHOD THEREOF

(71) Applicant: ANPEC ELECTRONICS CORPORATION, Hsinchu (TW)

(72) Inventors: Wei-Chen Liu, Hsinchu City (TW); Wen-Yen Chen, Hsinchu City (TW); Che-Chang Chang, Hsinchu County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 34 days.

(21) Appl. No.: 19/078,255

(22) Filed: Mar. 12, 2025

(65) Prior Publication Data

US 2026/0173243 A1 Jun. 18, 2026

(30) Foreign Application Priority Data

Dec. 17, 2024 (TW) ................................ 113149054

(51) Int. Cl.
*H05B 47/20* (2020.01)

(52) U.S. Cl.
CPC .................................... *H05B 47/20* (2020.01)

(58) Field of Classification Search
CPC ...................................................... H05B 47/20
See application file for complete search history.

(56) References Cited

U.S. PATENT DOCUMENTS

2008/0252231 A1* 10/2008 Huang ............... H05B 41/2855 315/254
2010/0001659 A1* 1/2010 Inoue ................. H05B 45/3725 315/291
2012/0299507 A1* 11/2012 Chen ...................... H05B 45/56 315/291

FOREIGN PATENT DOCUMENTS

KR 20200133249 A * 11/2020 ............. H05B 47/11

* cited by examiner

*Primary Examiner* — Abdullah A Riyami
*Assistant Examiner* — Syed M Kaiser
(74) *Attorney, Agent, or Firm* — Li & Cai Intellectual Property Office

(57) ABSTRACT

A light source drive system and a failure reporting method thereof. The light source drive system includes a control circuit and a drive circuit module. The driving circuit module has at least one light source driving circuit connected with the control circuit through a fault transmission line. The light source drive circuit has a fault arbitration circuit, including: a detection circuit, a fault reporting circuit, a switch and a fault control circuit. The fault control circuit initiates the counting duty cycle when the fault condition occurs, and controls the switch to be on in the detection time and the switch to be off in the delay time. The fault control circuit controls the detection circuit to detect a first level of the fault transmission line in the duty cycle, and outputs the detection time of different durations of time according to the different types of fault conditions.

20 Claims, 17 Drawing Sheets

LIGHT SOURCE DRIVE SYSTEM AND FAILURE REPORTING METHOD THEREOF

CROSS-REFERENCE TO RELATED PATENT APPLICATION

This application claims the benefit of priority to Taiwan Patent Application No. 113149054, filed on Dec. 17, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a driver circuit, and more particularly to a light source drive system and a failure reporting method thereof.

BACKGROUND OF THE DISCLOSURE

Existing light source drive systems commonly employ multiple light source driving circuits, with each driving circuit individually driving one or more light-emitting components, ensuring the proper operation of the light-emitting components. Current light source driving circuits typically integrate a power control circuit, which manages and controls the power output of a power conversion circuit that supplies power to the light-emitting components based on their operational status.

However, incorporating a power control circuit in each light source driving circuit increases the size and cost of the driving circuits. Furthermore, the need to establish control signal lines between each light source driving circuit and the power conversion circuit complicates the overall circuit design of the light source drive system, leading to increased complexity in circuit area design.

SUMMARY OF THE DISCLOSURE

In response to the above-referenced technical inadequacies, the present disclosure provides a light source drive system and a failure reporting method thereof.

The embodiments of the present disclosure provide a light source drive system including a control circuit and a drive circuit module. The drive circuit module includes at least one light source driving circuit, which is connected to the control circuit via a fault transmission line, so as to enable the control circuit to acquire a transmission content of the fault transmission line. The light source driving circuit has a fault arbitration circuit, which includes a detection circuit, a fault reporting circuit, a switch, and a fault control circuit. The detection circuit detects a duration for which the fault transmission line remains at a first level. The fault reporting circuit outputs a corresponding fault message based on the fault condition. The switch, connected to the fault transmission line, controls the fault transmission line to remain at the first level when turned on and at a second level when turned off. Upon the occurrence of a fault condition, the fault control circuit initiates a counting work cycle including a detection time and a delay time. The fault control circuit controls the switch to turn on during the detection time and to turn off during the delay time, and the fault control circuit also instructs the detection circuit to detect the fault transmission line at the first level during the work cycle. The fault control circuit outputs detection times of varying durations corresponding to types of fault conditions.

Another embodiment of the present disclosure provides a light source drive system including a control circuit and a drive circuit module. The drive circuit module includes a first light source driving circuit and a second light source driving circuit, both of which are connected to the control circuit via a fault transmission line, so as to enable the control circuit to acquire a transmission content of the fault transmission line. Each light source driving circuit has a fault arbitration circuit including a detection circuit, a fault reporting circuit, a switch, and a fault control circuit. The detection circuit detects a first level time of the fault transmission line. The fault reporting circuit outputs a fault message based on the fault condition. The switch, connected to the fault transmission line, controls the fault transmission line to remain at the first level when turned on and at the second level when turned off. The fault control circuit initiates a counting work cycle including a detection time and a delay time, upon detecting a fault condition. The fault control circuit controls the switch to turn on during the detection time and off during the delay time and controls the detection circuit to detect the fault transmission line at the first level during the work cycle. The fault control circuit outputs detection times of varying durations corresponding to different fault conditions and determines a control authority of the fault transmission line based on the first level time and the detection time.

An embodiment of the present disclosure further provides a failure reporting method of a light source drive system. When a fault condition occurs in the first light source driving circuit or the second light source driving circuit, a fault arbitration circuit in each of the first light source driving circuit and the second light source driving circuit initiates a counting work cycle. The first light source driving circuit and the second light source driving circuit are connected to a control circuit via a fault transmission line, so as to enable the control circuit to acquire transmission content of the transmission line. The work cycle includes a detection time and a delay time. The fault control circuit of the fault arbitration circuit controls a switch to turn on during the detection time and turn off during the delay time. The switch controls the fault transmission line to be at the first level when turned on and to be at the second level when turned off, and the fault control circuit outputs detection times of varying durations corresponding to different fault conditions and the detection circuit determines a control authority of the fault transmission line based on the first level time and the detection time.

In summary, the light source drive system and the failure reporting method thereof provided by the embodiments of the present disclosure can effectively simplify the circuit structure of the light source driving circuit. Additionally, a single fault transmission line can report various fault conditions, enabling the control circuit to identify the different fault conditions occurring in each light source driving circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
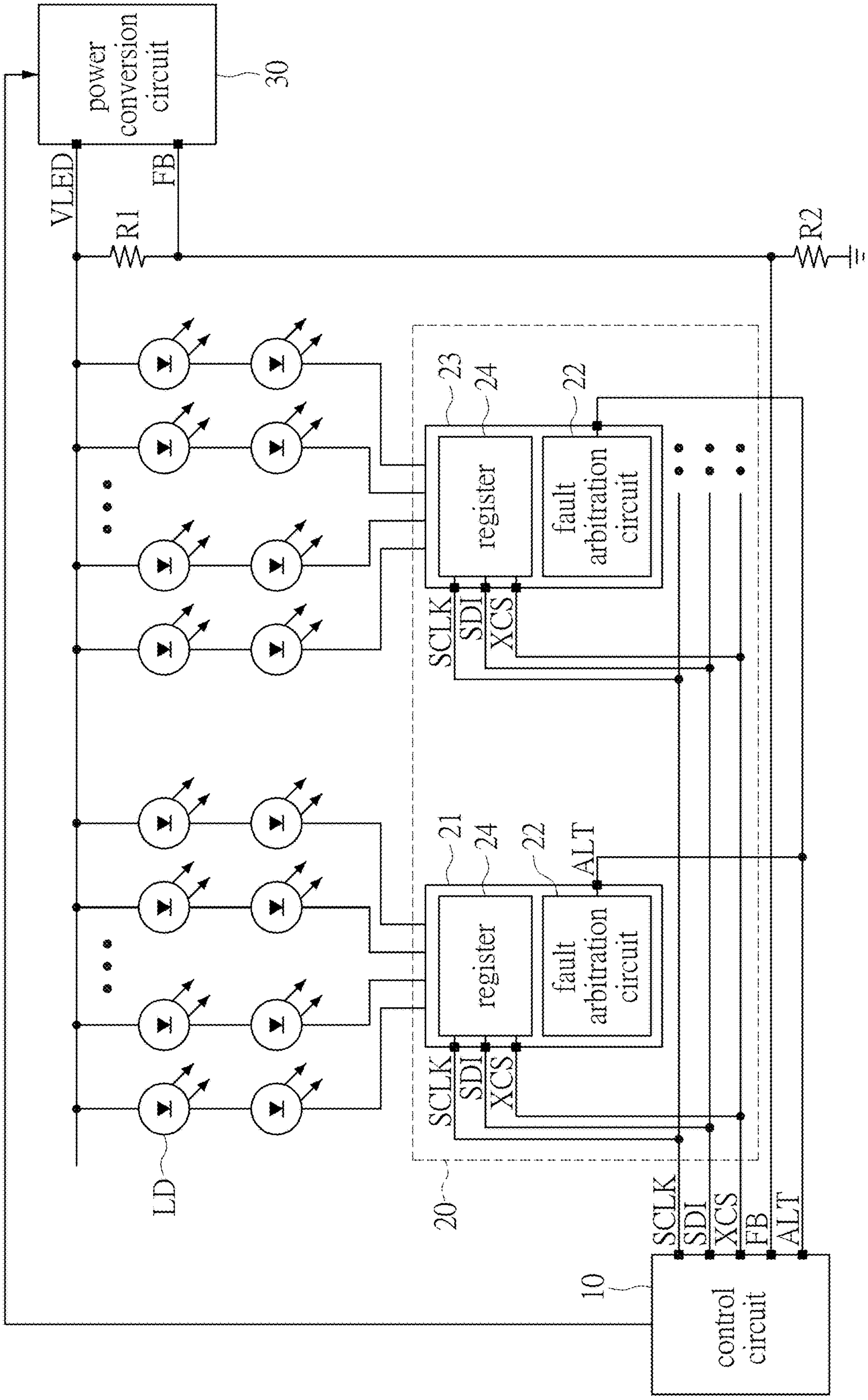
FIG. 1 is a schematic diagram of the light source drive system provided in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

An embodiment of the present disclosure provides a light source drive system and a failure reporting method thereof. The described light source drive system drives multiple illumination devices and, upon the occurrence of a fault condition, allows the system's control circuit to not only detect the fault but also identify its type. Furthermore, the control circuit can identify the fault type via a single transmission line (e.g., a fault transmission line) while the light source driving circuits responsible for driving the illumination devices use arbitration mechanisms to determine which circuit acquires the control authority of the single fault transmission line. As a result, the control circuit can process the fault information transmitted through the fault transmission line, thereby simplifying the complexity of the overall system circuit and reducing the area occupied by each light source driving circuit.

Usage Framework for the Light Source Drive System

Figure 2:
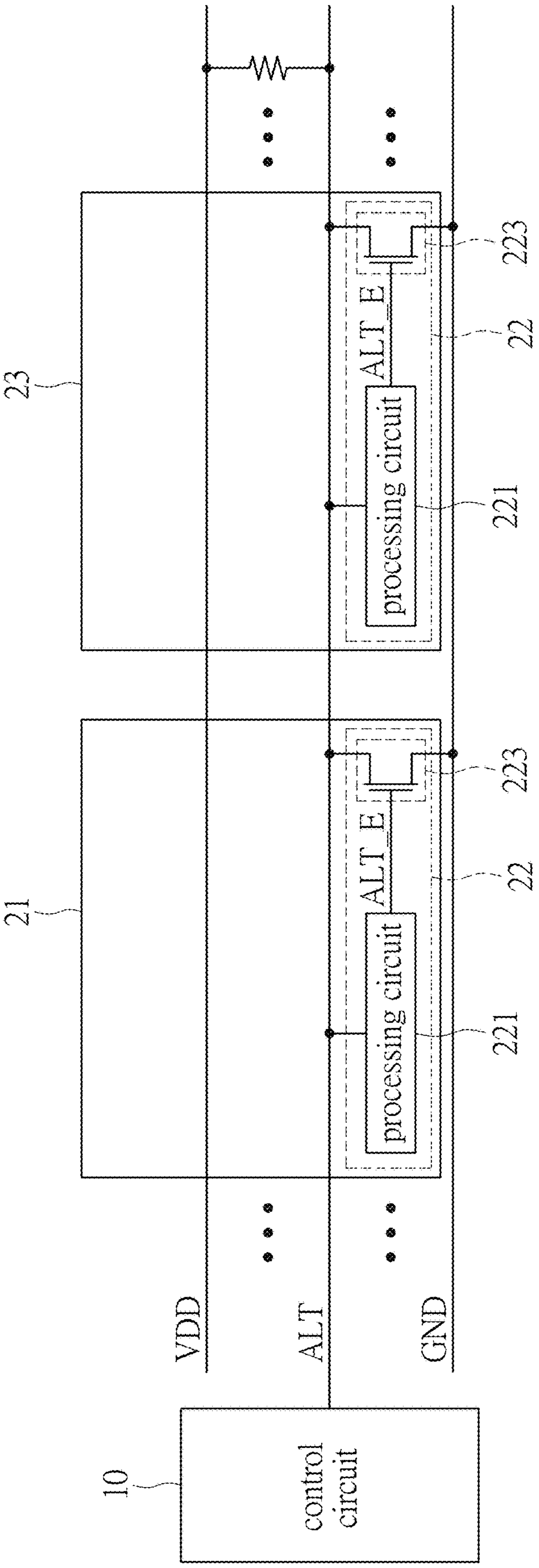
FIG. 2 is a schematic diagram illustrating the use of a fault arbitration circuit of the light source drive system provided in one embodiment of the present disclosure.
Figure 3:
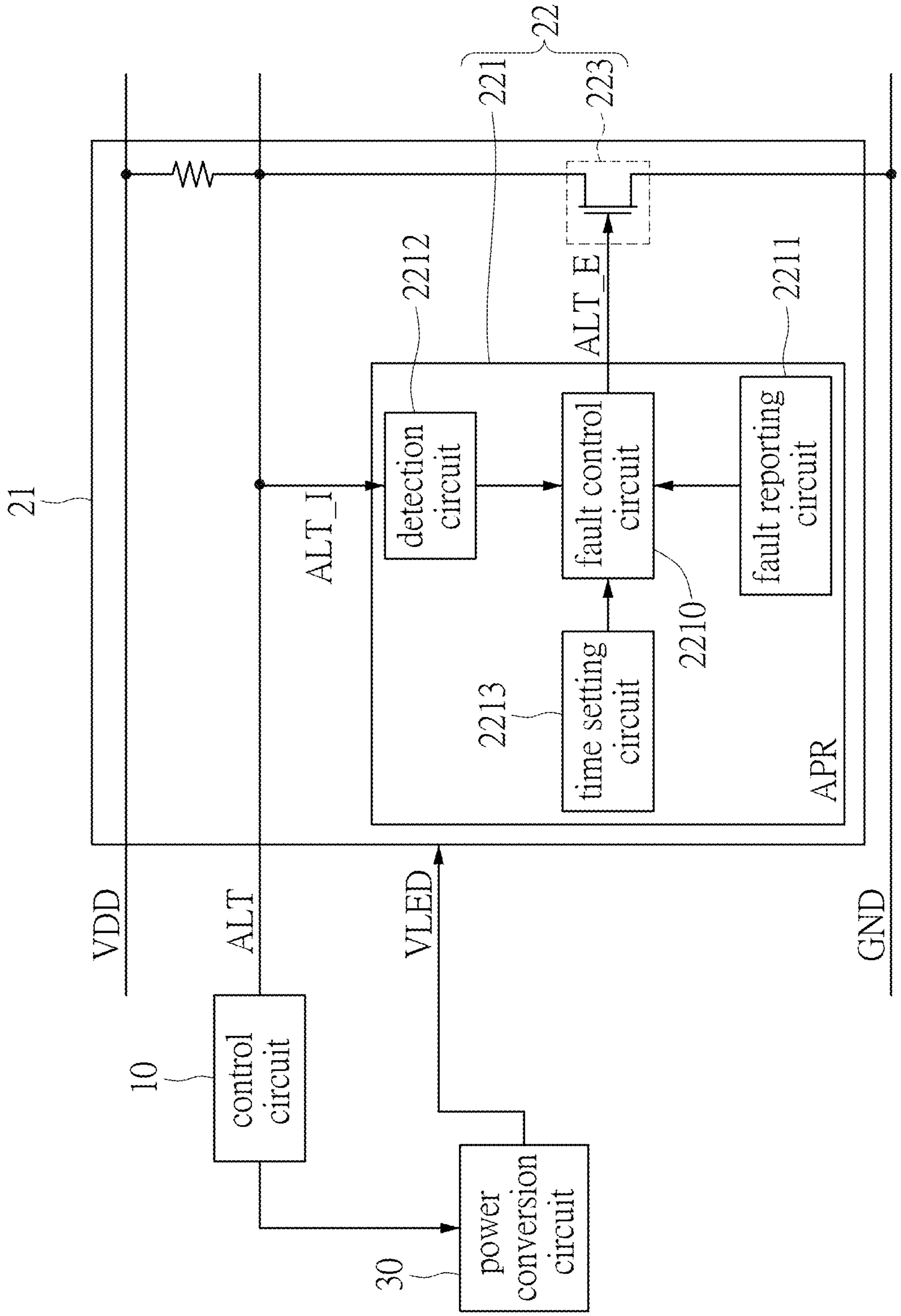
FIG. 3 is a schematic diagram of the fault arbitration circuit provided in one embodiment of the present disclosure.

Reference is made to FIGS. 1 through 3. FIG. 1 is a schematic diagram of the light source drive system provided in an embodiment of the present disclosure. FIG. 2 is a schematic diagram illustrating the use of a fault arbitration circuit of the light source drive system provided in an embodiment of the present disclosure. FIG. 3 is a schematic diagram of the fault arbitration circuit provided in an embodiment of the present disclosure. The light source drive system comprises a control circuit 10 and a drive circuit module 20. The control circuit 10 connects the drive circuit module 20 and a power conversion circuit 30, while the drive circuit module 20 connects to the power conversion circuit 30. The drive circuit module 20 may include one or more light source driving circuits. For simplicity, FIGS. 1 and 2 illustrate a structure with at least a first light source driving circuit 21 and a second light source driving circuit 23. Each light source driving circuit can drive one or more illumination devices, which may include one or more lighting elements LD, such as LED elements. The control circuit 10 directly controls the power conversion circuit 30 without the need to route control through the light source driving circuits, so as to allow the light source driving circuits in the drive circuit module 20 to power the illumination devices according to the supply from the power conversion circuit 30, which may be a DC/DC power conversion circuit.

In one embodiment, the control circuit 10 and each light source driving circuit share a single transmission line to transmit fault messages, denoted as a fault transmission line ALT. For instance, when a fault occurs, each light source driving circuit can communicate the related fault message to the control circuit 10 through the fault transmission line ALT. The control circuit 10 can process the fault message transmitted through the fault transmission line ALT to identify the fault type and implement corresponding controls.

Furthermore, each light source driving circuit is equipped with a fault arbitration circuit 22. The light source driving circuits use the arbitration results from the fault arbitration circuit 22 to determine whether the current light source driving circuit has a control authority over the fault transmission line ALT. The light source driving circuit that acquires the control authority of the fault transmission line ALT can then report the fault message to the control circuit 10.

For example, if only one of the first light source driving circuit 21 or the second light source driving circuit 23 experiences a fault, such as when the first light source driving circuit 21 encounters a fault, it directly acquires the control authority of the fault transmission line ALT. The first light source driving circuit 21 then reports the corresponding fault message to the control circuit 10 via the fault transmission line ALT. Conversely, if the first light source driving circuit 21 and the second light source driving circuit 23 experience faults sequentially, the first light source driving circuit 21 that first encountered the fault acquires the control authority of the fault transmission line ALT. Alternatively, if both the first light source driving circuit 21 and the second light source driving circuit 23 encounter faults simultaneously, the light source driving circuit with the higher priority fault type acquires the control authority of the fault transmission line ALT.

It should be noted that the fault messages generated by the light source driving circuits can vary based on the types of fault conditions. For instance, the fault messages may include a first fault message of a first level or a second fault message of a second level. The first fault message, for example, may indicate a power deficiency, while the second fault message may represent a short-circuit detection warning, an over-temperature warning (OTA Alert), or an over-power warning (OTW Alert). The second-level fault message takes precedence over the first-level fault message. In other embodiments, a third-level fault message, which includes both the first and second fault messages, may also exist. The third-level fault message takes precedence over the second-level fault message.

It can be understood that when the control circuit 10 acquires the fault type through the fault message transmitted via the fault transmission line ALT, the control circuit 10 can execute corresponding control. For example, when the control circuit 10 determines that the fault message is a first fault message, the control circuit 10 can control the power conversion circuit 30 to perform voltage output control processing, such as boosting the output voltage VLED of the power conversion circuit 30 to meet the voltage requirements of the light source driving circuit for driving the lighting device. Alternatively, when the control circuit 10 determines that the fault message is a second fault message, the control circuit 10 can control the communication bus to acquire the content of the second fault message stored in the register 24 within the light source driving circuit, thereby identifying the type and location of the fault event. The communication bus may include signal transmission lines such as SCLK, SDI, and XCS. Furthermore, when the control circuit 10 determines that the fault message is a third fault message, the process can be performed by referring to the methods for the first fault message and the second fault message described above.

In one embodiment, when a fault condition occurs in a light source driving circuit, a working cycle is initiated to confirm whether the control authority of the fault transmission line ALT can be acquired. The working cycle consists of a detection time and a delay time, where the sum of the detection time and delay time equals the cycle time of the working cycle. The duration of the detection time varies depending on the types of fault conditions. For instance, when the fault condition corresponds to the first fault message, the detection time equals the first detection time; when the fault condition corresponds to the second fault message, the detection time equals a second detection time; and when the fault condition corresponds to the third fault message, the detection time equals the third detection time. The third detection time is greater than the second detection time, and the second detection time is greater than the first detection time.

For example, the cycle time of the working cycle is fixed at T2. When the first detection time is T1, the delay time is T1_DELAY=T2−T1. When the second detection time is T1*2, the delay time is T1_DELAY=T2−T1*2. When the third detection time is T1*3, the delay time is T1_DELAY=T2−T1*3. Moreover, the power conversion circuit 30 requires a fixed time for executing voltage boost or reduction processes, so the control circuit 10 ensures that the working cycle aligns with a fixed duration.

Embodiment of Fault Arbitration Circuit

Reference is made to FIG. 2, in which each of the first light source driving circuit 21 and the second light source driving circuit 23 is equipped with a fault arbitration circuit 22. This fault arbitration circuit 22 comprises a processing circuit 221 and a switch 223. The processing circuit 221 is connected to the fault transmission line ALT and the switch 223. When a fault condition occurs, the processing circuit 221, in coordination with the switch 223, maintains the fault transmission line ALT at a fault-reporting level (e.g., the first level) during the switch's conduction period, which is governed by the detection time. In addition, when the switch 223 is off, the fault transmission line ALT remains at a non-reporting level (e.g., the second level), and the off period is determined by the delay time.

In one embodiment, the first level may be a logical low level, while the second level may be a logical high level. For example, when the switch 223 is on, the fault transmission line ALT is pulled to a logical low level at the ground terminal, and when the switch 223 is off, the fault transmission line ALT is pulled to a logical high level at the VDD terminal via a pull-up resistor.

In another embodiment, the processing circuit 221 determines the control authority of the fault transmission line based on the detection time (internal time) corresponding to the fault condition and the time the fault transmission line ALT remains at the first level (external time). In other embodiments, the internal time may also refer to the duration of the fault condition.

Taking the architecture of FIG. 2 as an example, when only the first light source driving circuit 21 encounters the fault condition, and assuming that the fault condition corresponds to the first fault message, the detection time used internally by the processing circuit 221 of the first light source driving circuit 21 is the first detection time, while the fault transmission line ALT remains at the first level for the first level time. In this scenario, the first level time (external time) does not exceed the first detection time (internal time). At this time, the first detection time is equal to the first level time, or the first level time does not exceed the duration of the fault condition. Accordingly, the first light source driving circuit 21 acquires the control authority of the fault transmission line ALT. Simultaneously, the control circuit 10 can determine that the fault condition corresponds to the first fault message based on the fault transmission line ALT remaining at the first level for a time equal to the first detection time. Conversely, if the first level time (external time) exceeds the first detection time (internal time) or if the first level time exceeds the duration of the fault condition, the first light source driving circuit 21 does not acquire the control authority of the fault transmission line ALT.

Taking the architecture in FIG. 2 as another example, when the first light source driving circuit 21 and the second light source driving circuit 23 simultaneously encounter the fault condition, and assuming that the fault condition of the first light source driving circuit 21 corresponds to a first fault message while the fault condition of the second light source driving circuit 23 corresponds to a second fault message. At this time, the detection time used internally by the processing circuit 221 of the first light source driving circuit 21 is the first detection time, and the detection time used internally by the processing circuit 221 of the second light source driving circuit 23 is the second detection time. Since the second detection time is greater than the first detection time, the first level time during which the fault transmission line ALT remains at the first level equals the second detection time. In this scenario, for the processing circuit 221 of the first light source driving circuit 21, the first level time, considered as external time, exceeds the first detection time. For the processing circuit 221 of the second light source driving circuit 23, the first level time does not exceed the second detection time. Accordingly, the second light source driving circuit 23 acquires the control authority of the fault transmission line ALT. Simultaneously, the control circuit 10 can determine that the fault condition corresponds to the second fault message based on the fault transmission line ALT remaining at the first level for a time equal to the second detection time.

It is understood that for any light source driving circuit of the drive circuit module 20, if a higher-priority fault condition occurs, that circuit acquires the control authority of the fault transmission line ALT.

Reference is made to FIG. 3 for an example architecture of the fault arbitration circuit 22 used in the light source driving circuit. The processing circuit 221 includes a detection circuit 2212, a fault reporting circuit 2211, and a fault control circuit 2210. The fault control circuit 2210 connects to the detection circuit 2212, the fault reporting circuit 2211, and the control terminal of the switch 223. The first terminal of the switch 223 connects to the fault transmission line ALT, while the second terminal of the switch 223 connects to the ground terminal.

In one embodiment, the fault control circuit 2210 determines whether a fault condition exists in the light source driving circuit based on reports from the fault reporting circuit 2211. The fault reporting circuit 2211 evaluates the operating status of the light source driving circuit and identifies the fault condition. Furthermore, the fault reporting circuit 2211 outputs corresponding fault messages, such as the first fault message, second fault message, or third fault message, depending on the type of fault condition.

When the fault control circuit 2210 receives the fault message output by the fault reporting circuit 2211, it initiates a working cycle. The detection time within the working cycle is set based on the type of fault message. For instance, when the fault message is the first fault message, the fault control circuit 2210 controls the conduction time of the switch 223 to correspond to the first detection time. When the fault message is the second fault message, the fault control circuit 2210 controls the conduction time of the switch 223 to correspond to the second detection time. When the fault message is the third fault message, the fault control circuit 2210 controls the conduction time of the switch 223 to correspond to the third detection time.

It should be noted that when the fault control circuit 2210 starts the working cycle count, it also controls the detection circuit 2212 to measure the duration for which the fault transmission line ALT remains at the first level during the working cycle, yielding the first level time (external time). On the other hand, within the working cycle, the fault control circuit 2210 first controls the switch 223 to conduct during the detection time (internal time) of the working cycle, followed by controlling the switch 223 to remain off during the delay time of the working cycle.

In one embodiment, the fault control circuit 2210 determines the internal time and external time during the working cycle and uses their relative magnitudes to decide whether the current light source driving circuit can acquire the control authority of the fault transmission line ALT. If the external time is not greater than the internal time, it indicates that no other light source driving circuit has requested the fault transmission line, or even if such a request was made, the priority level of the fault condition in the requesting circuit is not higher than that of the current light source driving circuit. In this case, the current light source driving circuit acquires the control authority of the fault transmission line ALT.

Conversely, if the external time is greater than the internal time, it indicates that another light source driving circuit has requested use of the fault transmission line ALT, and the priority level of the fault condition in that circuit is higher than that of the current light source driving circuit. Therefore, the current light source driving circuit cannot acquire the control authority of the fault transmission line ALT, which is instead controlled by the other light source driving circuit with the higher priority fault condition.

In one embodiment, the internal time refers to the detection time during which the fault control circuit 2210 controls the switch 223 to conduct. It may also refer to the duration of the fault condition. The external time refers to the first level time during which the detection circuit 2212 detects that the fault transmission line ALT remains at the first level.

In one embodiment, the working cycle and detection time used by the fault control circuit 2210 can be set by a time setting circuit 2213. The time setting circuit 2213 is connected to the fault control circuit 2210 and can provide the working cycle and detection time to the fault control circuit 2210. The working cycle and detection time are set based on usage requirements, and the configured working cycle and detection time are fixed values. The detection time may vary according to the type of fault condition, so as to provide corresponding detection times such as the first detection time, second detection time, and third detection time, where the durations of each detection time differ. For instance, the duration of the first detection time is shorter than that of the second detection time, and the duration of the second detection time is shorter than that of the third detection time.

It is understood that when the fault control circuit 2210 identifies a fault condition via the fault reporting circuit 2211, it can acquire the corresponding detection time from the time setting circuit 2213 according to the type of fault condition. In addition, in conjunction with the working cycle provided by the time setting circuit 2213, the delay time can be further calculated. For instance, the fault control circuit 2210 can calculate the delay time by subtracting the detection time from the working cycle.

Embodiment of the Fault Reporting Method for the Light Source Drive System

The following illustrates various possible fault reporting methods for the light source drive system. The following examples use the architecture of the first light source driving circuit 21 and the second light source driving circuit 23 in the drive circuit module 20 for convenience of explanation.

Figure 4A:
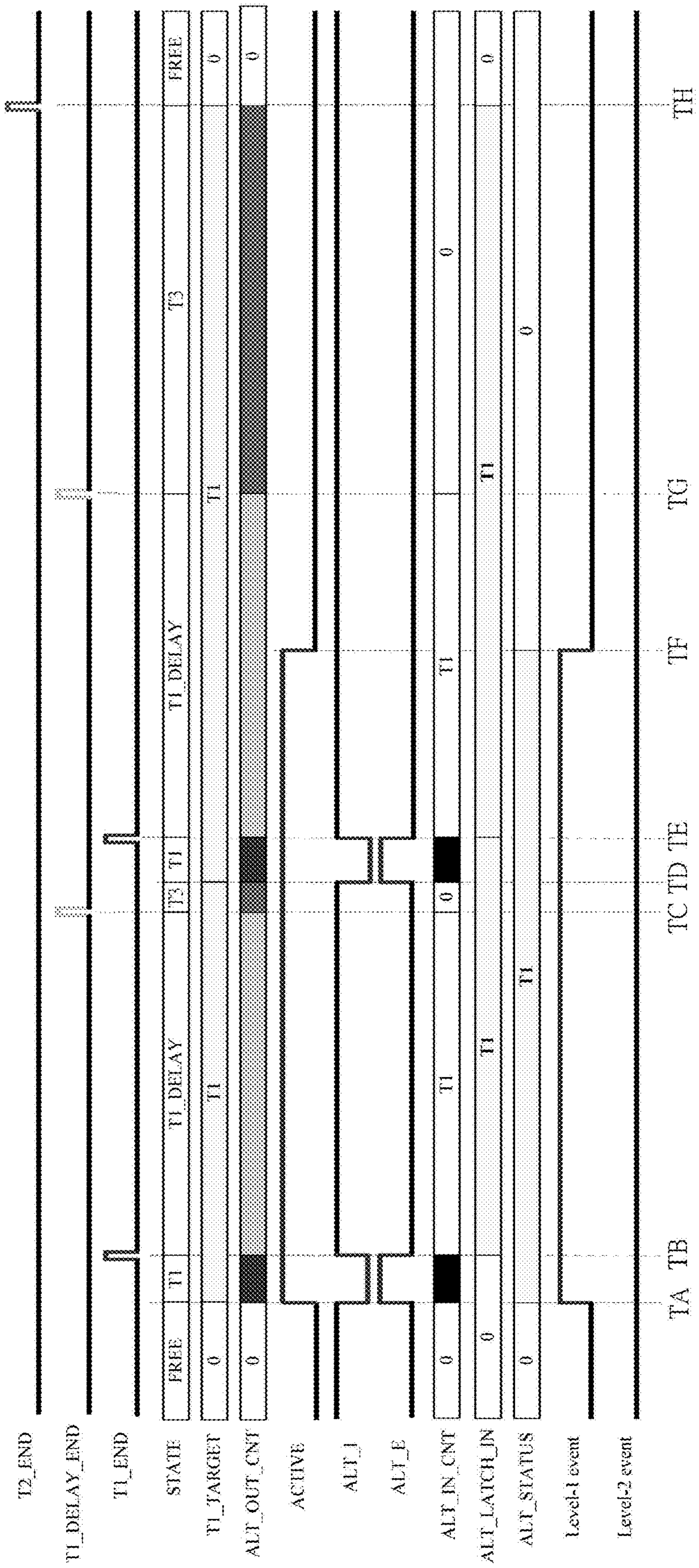
FIGS. 4A and 4B are schematic diagrams illustrating the occurrence of a single fault condition in a single light source driving circuit of the light source drive system provided in one embodiment of the present disclosure.
Figure 4B:
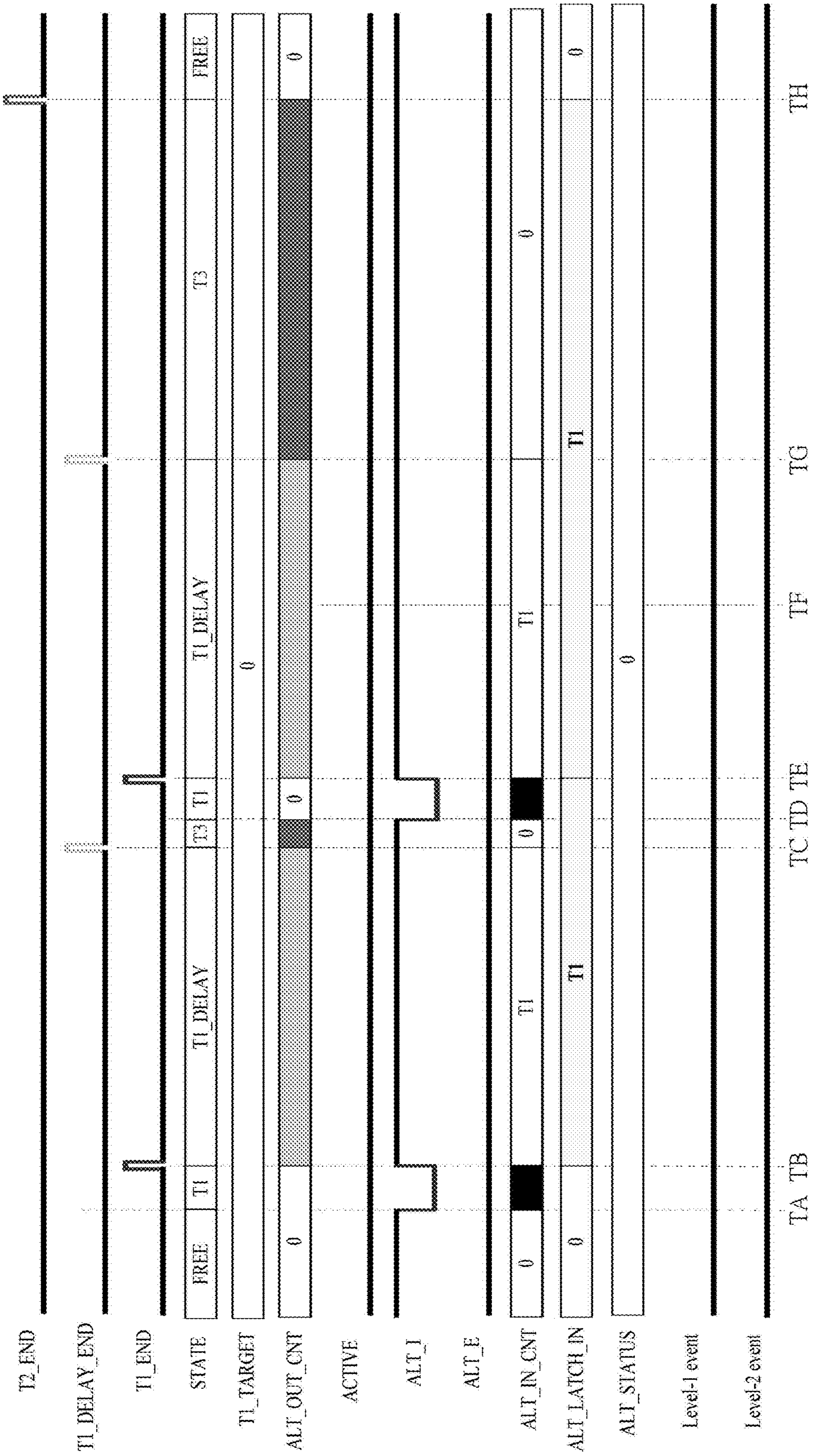

Reference is made to FIGS. 4A and 4B, which show schematic diagrams of single fault conditions occurring in a single light source driving circuit of the light source drive system according to embodiments of the present disclosure. FIG. 4A shows the relevant control waveform of the first light source driving circuit 21, and FIG. 4B shows the relevant control waveform of the second light source driving circuit 23. In FIGS. 4A and 4B, "Level-1 event" indicates the occurrence of the first fault message, and "Level-2 event" indicates the occurrence of the second fault message.

As shown in FIG. 4A, for the first light source driving circuit 21, the fault reporting circuit 2211 can determine the occurrence of a first fault message based on the states of the Level-1 event and Level-2 event. Specifically, the Level-1 event maintaining a logical high level from time TA to TF indicates that the first light source driving circuit 21 has encountered a first fault message. Therefore, the fault control circuit 2210 can start counting the working cycle (T2) at time TA. During this period, the fault control circuit 2210 controls the conduction time of the switch 223 using the output switch control signal (ALT_E) for a detection time equivalent to the first detection time (T1). In FIG. 4A, the switch control signal (ALT_E) is used to control the conduction or cutoff of the switch 223. Additionally, the level changes of the fault transmission line ALT can be represented by ALT_I. Since the second light source driving circuit 23 does not report any fault messages, the level changes of the fault transmission line ALT are influenced by the first detection time of the first light source driving circuit 21. The duration of the fault condition can be represented by ALT_STATUS. As shown in FIG. 4A, the fault condition duration spans from time TA to TF, maintaining a logical high level.

Furthermore, in the first light source driving circuit 21 shown in FIG. 4A, the switch 223 is turned on according to the switch control signal (ALT_E) during the period from time TA to TB, and the on-time corresponds to the first detection time (T1). Additionally, the detection circuit 2212 detects that the level of ALT_I remains at the first level (logical low level) for the first level time, which is the period from time TA to TB and equals the first detection time (T1). This demonstrates that the first level time does not exceed the first detection time (T1) or the duration of the fault condition. Consequently, the first light source driving circuit 21 can acquire the control authority of the fault transmission line ALT. As shown in FIG. 4A, ACTIVE is represented at a logical high level during the period from time TA to TF.

It should be noted that when the working cycle ends at time TC, a waiting time T3 must elapse before the execution of the next working cycle. For example, the period from time TC to TD represents the waiting time T3. After time TD, another working cycle begins. Since the Level-1 event remains at a logical high level at time TD, the working cycle initiated at time TD can be processed in accordance with the previously described method.

However, at time TF, the Level-1 event transitions to a logical low level, indicating that the first fault message originally reported by the first light source driving circuit 21 has been cleared. Consequently, at time TF, the ACTIVE also transitions to a logical low level. When the working cycle ends at time TG, the system enters the waiting time T3. After the waiting time T3 ends, such as at time TH, the control of the fault transmission line ALT can again be acquired by any light source driving circuit.

Additionally, reference is made to FIG. 4B, in which no fault condition occurs in the second light source driving circuit 23. The first level time or the fault condition duration in the second light source driving circuit 23 is zero. Consequently, the detection circuit 2212 of the second light source driving circuit 23 determines that the first level time of the fault transmission line ALT is greater than the detection time or the fault condition duration. As a result, the second light source driving circuit 23 cannot acquire the control authority of the fault transmission line ALT, and the ACTIVE of the second light source driving circuit 23 remains at a logic low level.

Moreover, it is specifically noted that the standard duration of the waiting time T3 can be set by the time setting circuit 2213. The standard duration of the waiting time T3 may vary depending on whether a light source driving circuit actively controls the fault transmission line ALT.

For instance, in FIG. 4A, ACTIVE is represented as a logic high level from time TA to TF, meaning that the first light source driving circuit 21 has control over the fault transmission line ALT. Furthermore, the interval between time TC and TD represents the waiting time T3. However, at time TD, the first light source driving circuit 21 needs to restart the counting of the next working cycle (T2). Therefore, the counting of the waiting time T3 must end early, and the waiting time T3 in the interval from TC to TD does not reach the standard length. Conversely, the waiting time T3 in the interval from TG to TH can reach the standard length because the first light source driving circuit 21, which originally controlled the fault transmission line ALT, has relinquished control (i.e., ACTIVE is at a logic low level). Thus, the first light source driving circuit 21 will not prematurely end the counting of the waiting time T3.

Figure 5A:
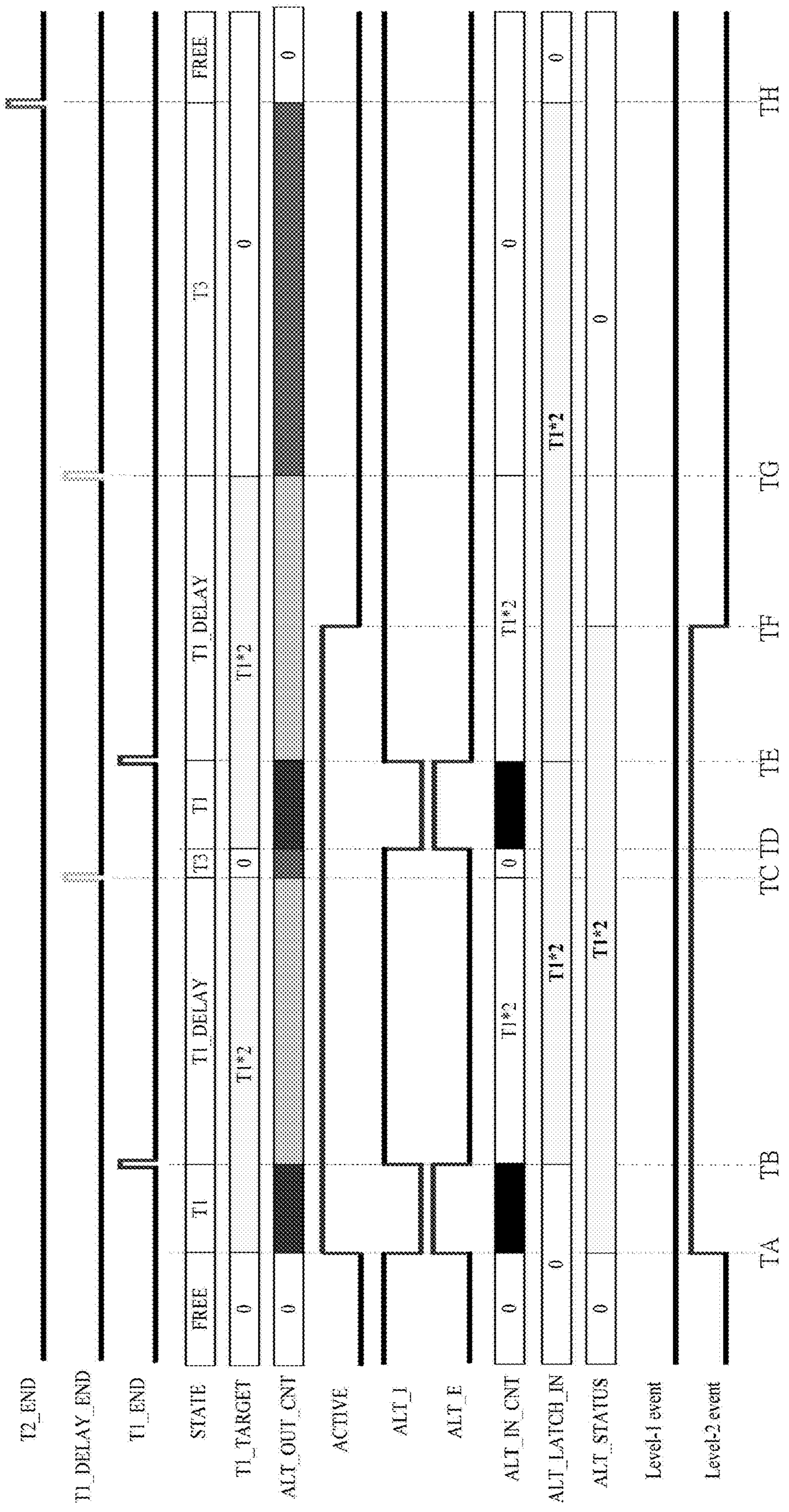
FIGS. 5A and 5B are schematic diagrams illustrating the occurrence of a single fault condition in a single light source driving circuit of the light source drive system provided in one embodiment of the present disclosure.
Figure 5B:
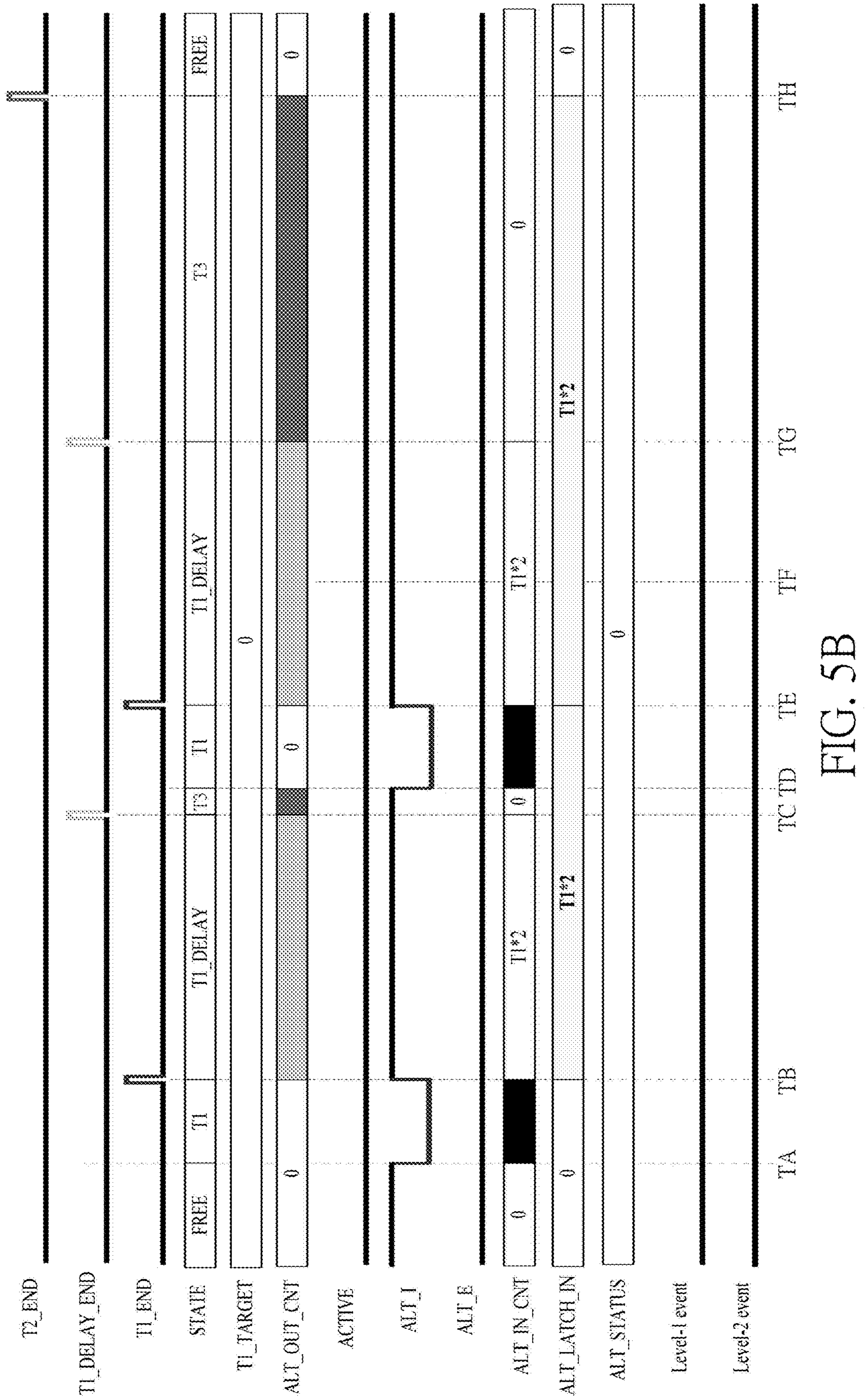

Reference is made to FIGS. 5A and 5B, which show schematic diagrams of single fault conditions occurring in a single light source driving circuit of the light source drive system according to embodiments of the present disclosure. FIG. 5A shows the relevant control waveform of the first light source driving circuit 21, and FIG. 5B shows the relevant control waveform of the second light source driving circuit 23.

As shown in FIG. 5A, for the first light source driving circuit 21, the fault reporting circuit 2211 can determine the occurrence of a second fault message based on the states of the Level-1 event and Level-2 event. Specifically, the Level-1 event remains at a logic high level from time TA to TF, indicating that the first light source driving circuit 21 has encountered a second fault message. Therefore, the fault control circuit 2210 can initiate the counting of the working cycle (T2) at time TA. During this period, the fault control circuit 2210 uses the output switch control signal (ALT_E) to control the switch 223, and the detection time is set to the second detection time (T1*2).

Furthermore, in FIG. 5A, the switch 223 of the first light source driving circuit 21 is turned on according to the switch control signal (ALT_E) from time TA to TB, and this conduction time corresponds to the second detection time (T1*2). Additionally, the detection circuit 2212 detects that the level of ALT_I remains at the first level (logic low level) for the first level time. This first level time occurs between time TA and TB and equals the second detection time (T1*2). From this, it can be understood that the first level time is not greater than the second detection time (T1*2) or the duration of the fault condition. Therefore, the first light source driving circuit 21 can acquire the control authority of the fault transmission line ALT, as represented by ACTIVE being at a logic high level from time TA to TF in FIG. 5A.

Additionally, reference is made to FIG. 5B. For the second light source driving circuit 23, no fault conditions occur. The first level time or the duration of the fault condition in the second light source driving circuit 23 is zero. Therefore, the detection circuit 2212 in the second light source driving circuit 23 determines that the first level time of the fault transmission line ALT is greater than the detection time or the duration of the fault condition. Consequently, the second light source driving circuit 23 cannot acquire the control authority of the fault transmission line ALT, and the ACTIVE of the second light source driving circuit 23 remains at a logic low level.

Figure 6A:
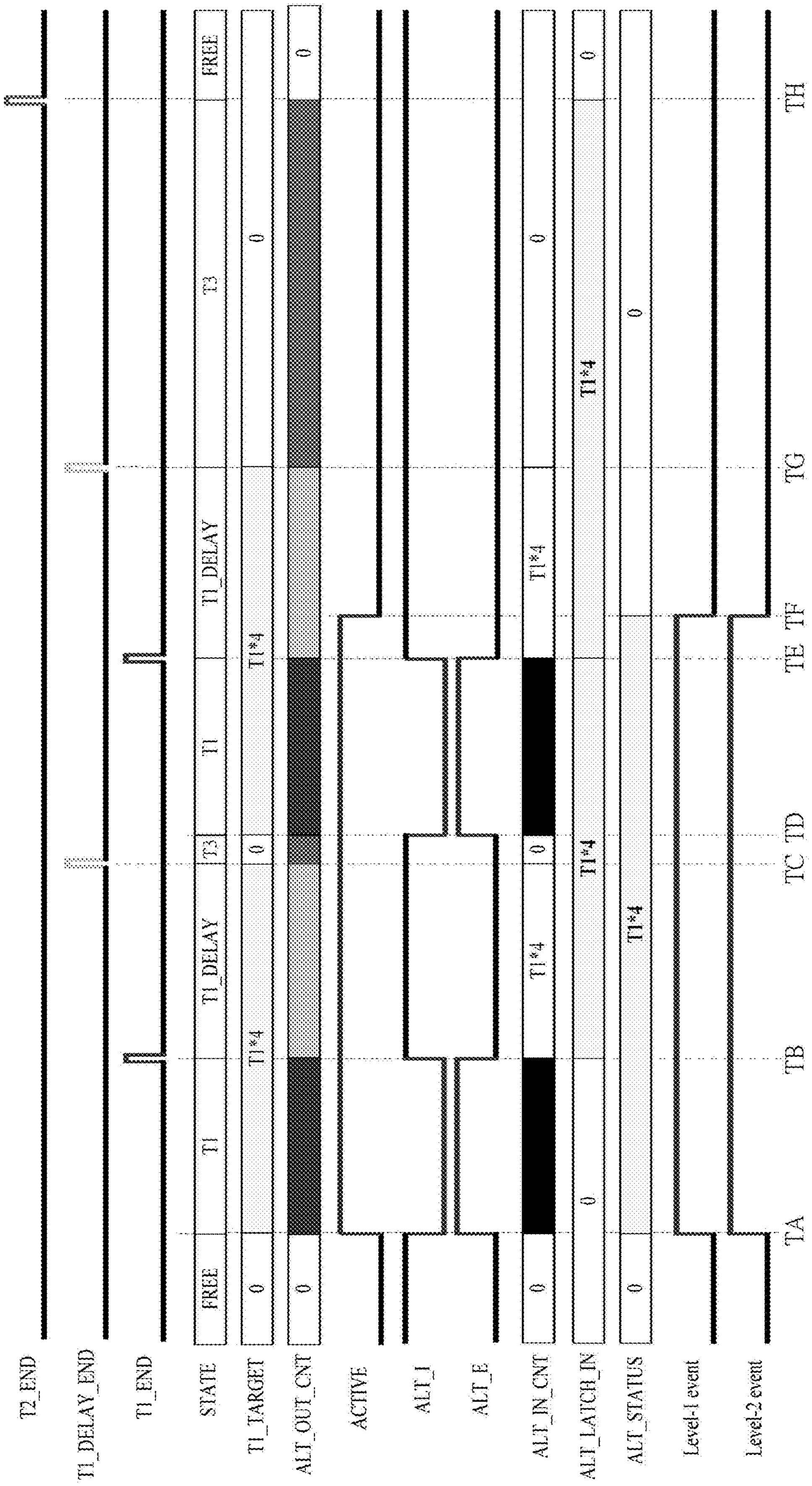
FIGS. 6A and 6B are schematic diagrams illustrating the simultaneous occurrence of multiple fault conditions in a single light source driving circuit of the light source drive system provided in one embodiment of the present disclosure.
Figure 6B:
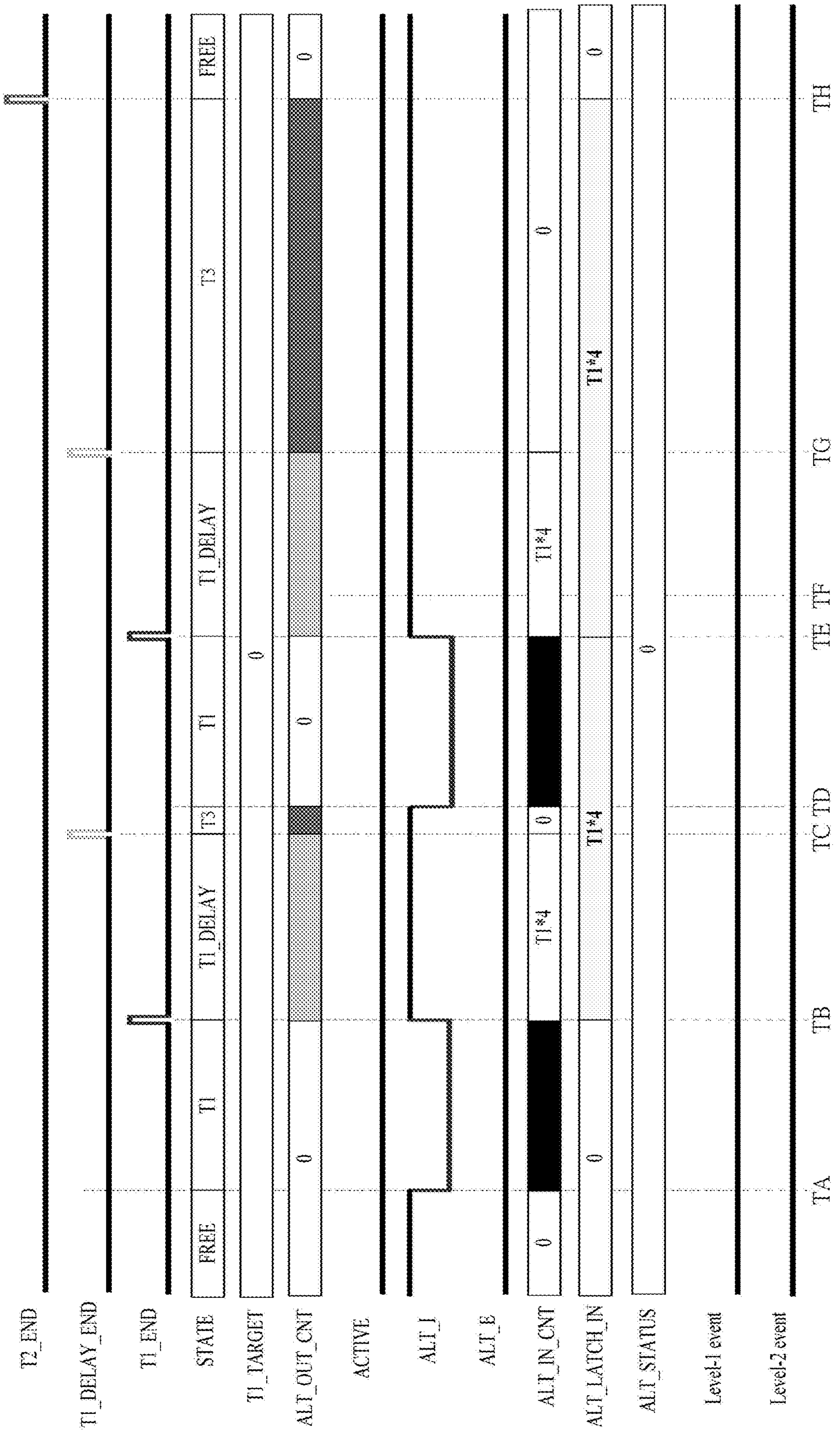

Reference is made to FIGS. 6A and 6B, which illustrate schematic diagrams of a single light source driving circuit encountering multiple fault conditions simultaneously in the light source driving system according to embodiments of the present disclosure. FIG. 6A shows the relevant control waveform of the first light source driving circuit 21, and FIG. 6B shows the relevant control waveform of the second light source driving circuit 23.

As shown in FIG. 6A, for the first light source driving circuit 21, the fault reporting circuit 2211 can determine the occurrence of a third fault message based on the states of the Level-1 event and Level-2 event. Specifically, both the Level-1 event and Level-2 event remain at a logic high level from time TA to TF, indicating that the first light source driving circuit 21 has encountered a third fault message. Consequently, the fault control circuit 2210 can initiate the counting of the working cycle (T2) at time TA. During this period, the fault control circuit 2210 uses the output switch control signal (ALT_E) to control the switch 223, and the detection time is set to the third detection time (T1*4).

Furthermore, in FIG. 6A, the switch 223 of the first light source driving circuit 21 is turned on according to the switch control signal (ALT_E) from time TA to TB, and this conduction time corresponds to the third detection time (T1*4). Additionally, the detection circuit 2212 detects that the level of ALT_I remains at the first level (logic low level) for the first level time. This first level time occurs between time TA and TB and equals the third detection time (T1*4). From this, it can be understood that the first level time is not greater than the third detection time (T1*4) or the duration of the fault condition. Therefore, the first light source driving circuit 21 can acquire the control authority of the fault transmission line ALT, as represented by ACTIVE being at a logic high level from time TA to TF in FIG. 6A.

Additionally, reference is made to FIG. 6B. For the second light source driving circuit 23, no fault conditions occur. The first level time or the duration of the fault condition in the second light source driving circuit 23 is zero. Therefore, the detection circuit 2212 in the second light source driving circuit 23 determines that the first level time of the fault transmission line ALT is greater than the detection time or the duration of the fault condition. Consequently, the second light source driving circuit 23 cannot acquire the control authority of the fault transmission line ALT, and the ACTIVE of the second light source driving circuit 23 remains at a logic low level.

Figure 7A:
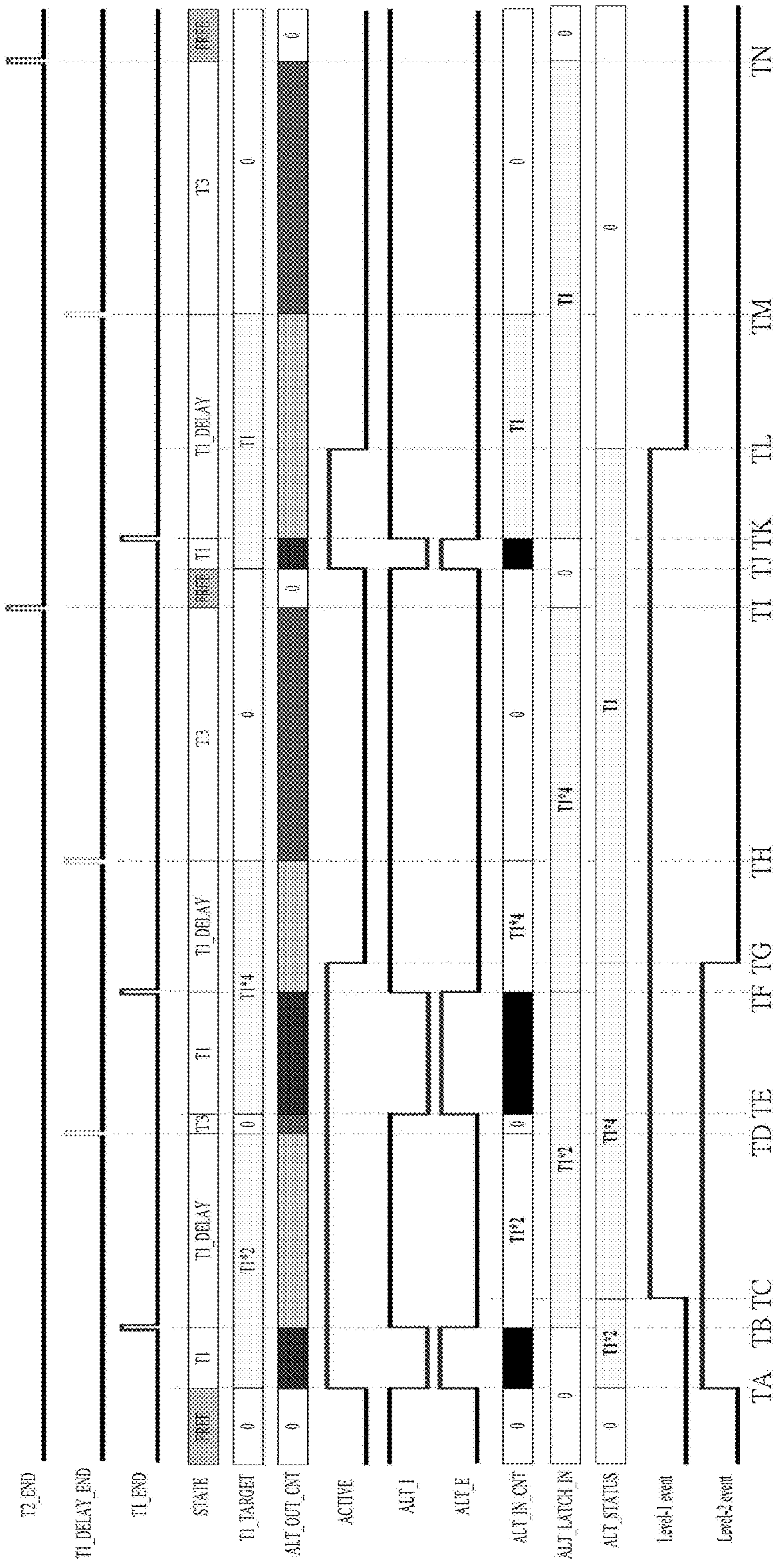
FIGS. 7A and 7B are schematic diagrams illustrating the sequential occurrence of multiple fault conditions in a single light source driving circuit of the light source drive system provided in one embodiment of the present disclosure.
Figure 7B:
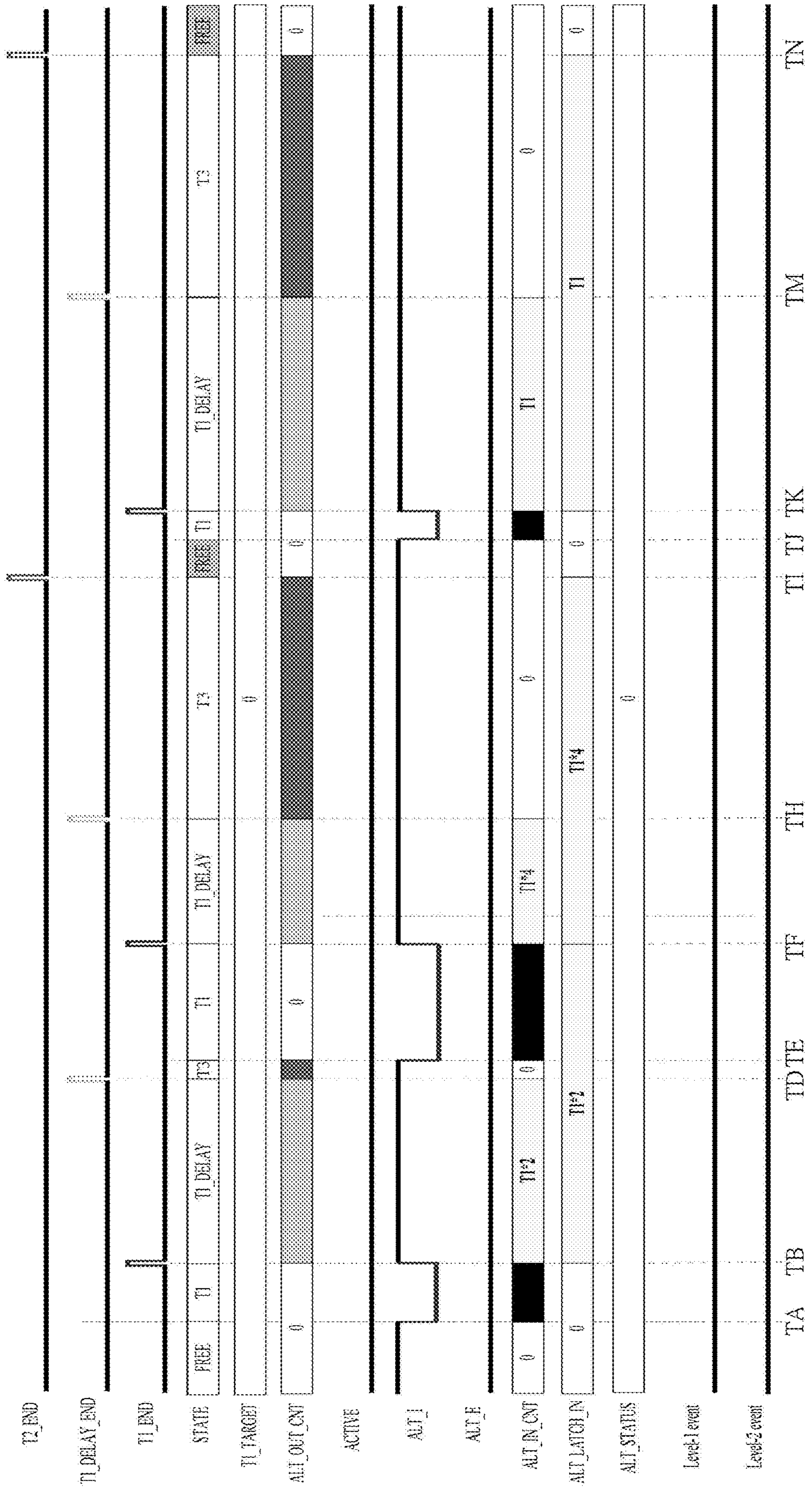

Reference is made to FIGS. 7A and 7B, which illustrate schematic diagrams of a single light source driving circuit experiencing successive single fault conditions in the light source driving system according to embodiments of the present disclosure. FIG. 7A shows the relevant control waveform of the first light source driving circuit 21, and FIG. 7B shows the relevant control waveform of the second light source driving circuit 23.

As shown in FIG. 7A, for the first light source driving circuit 21, the fault reporting circuit 2211 can determine the occurrence of the second fault message and third fault message successively based on the states of the Level-1 event and Level-2 event. Specifically, from time TA to TC, only the Level-2 event remains at a logic high level; from time TC to TG, both the Level-1 event and Level-2 event simultaneously remain at a logic high level; and from time TG to TL, only the Level-1 event remains at a logic high level. Therefore, for the fault reporting circuit 2211 of the first light source driving circuit 21, the second fault message is identified between time TA and TC, the third fault message is identified between time TC and TG, and the first fault message is identified between time TG and TL.

For the first light source driving circuit 21, the fault control circuit 2210 can initiate the counting of a working cycle (T2) at time TA. During this working cycle, the fault control circuit 2210 controls the switch 223 to turn on via the output switch control signal (ALT_E) for a detection time corresponding to the second detection time (T1*2). As shown in FIG. 7A, the switch 223 of the first light source driving circuit 21 is turned on according to the switch control signal (ALT_E) during the period from time TA to TB, and the on-time corresponds to the second detection time (T1*2). Additionally, the detection circuit 2212 detects that the level of ALT_I remains at the first level (logical low level) for the first level time, which is the period from time TA to TB and equals the second detection time (T1*2). This demonstrates that the first level time does not exceed the second detection time (T1*2) or the duration of the fault condition. Consequently, the first light source driving circuit 21 can obtain control over the fault transmission line ALT. As shown in FIG. 7A, ACTIVE is represented at a logical high level during the period from time TA to TD.

It is noteworthy that when the working cycle ends at time TD, a waiting time T3 must elapse before the next working cycle is executed. For example, the interval from time TD to TE corresponds to the waiting time T3. At time TE, the next working cycle is initiated. Since both the Level-1 event and Level-2 event simultaneously remain at a logic high level at this time, the working cycle initiated at time TE can be processed in the same manner as described previously. For example, the fault control circuit 2210 can initiate the counting of the working cycle (T2) at time TE. During this period, the fault control circuit 2210 uses the output switch control signal (ALT_E) to control the switch 223, with the detection time set to the third detection time (T1*4). In FIG. 7A, the switch 223 of the first light source driving circuit 21 is turned on according to the switch control signal (ALT_E) from time TE to TF, and this conduction time corresponds to the third detection time (T1*4). Additionally, the detection circuit 2212 detects that the level of ALT_I remains at the first level (logic low level) for the first level time, which occurs between time TE and TF and equals the third detection time (T1*4). From this, it can be understood that the first level time is not greater than the third detection time (T1*4) or the duration of the fault condition. Therefore, the first light source driving circuit 21 can acquire the control authority of the fault transmission line ALT.

When the working cycle ends at time TH, a waiting time T3 must elapse before the next working cycle is executed. For example, the interval from time TH to TI corresponds to the waiting time T3. At time TJ, the next working cycle is initiated. Since the Level-1 event remains at a logic high level at this time, the working cycle initiated at time TJ can be processed in the same manner as described previously. For example, the fault control circuit 2210 can initiate the counting of the working cycle (T2) at time TJ. During this period, the fault control circuit 2210 uses the output switch control signal (ALT_E) to control the switch 223, with the detection time set to the first detection time (T1). In FIG. 7A, the switch 223 of the first light source driving circuit 21 is turned on according to the switch control signal (ALT_E) from time TJ to TK, and this conduction time corresponds to the first detection time (T1). Additionally, the detection circuit 2212 detects that the level of ALT_I remains at the first level (logic low level) for the first level time, which occurs between time TJ and TK and equals the first detection time (T1). From this, it can be understood that the first level time is not greater than the first detection time (T1) or the duration of the fault condition. Therefore, the first light source driving circuit 21 can acquire the control authority of the fault transmission line ALT.

When the working cycle ends at time TM, the system enters the waiting time T3. After the waiting time T3 has passed, such as at time TN, the control authority of the fault transmission line ALT will be released again to be available for use by any light source driving circuit.

Additionally, reference is made to FIG. 7B. For the second light source driving circuit 23, no fault conditions occur. This means that the second light source driving circuit 23 cannot acquire the control authority of the fault transmission line ALT, and the ACTIVE of the second light source driving circuit 23 remains at a logic low level.

Figure 8A:
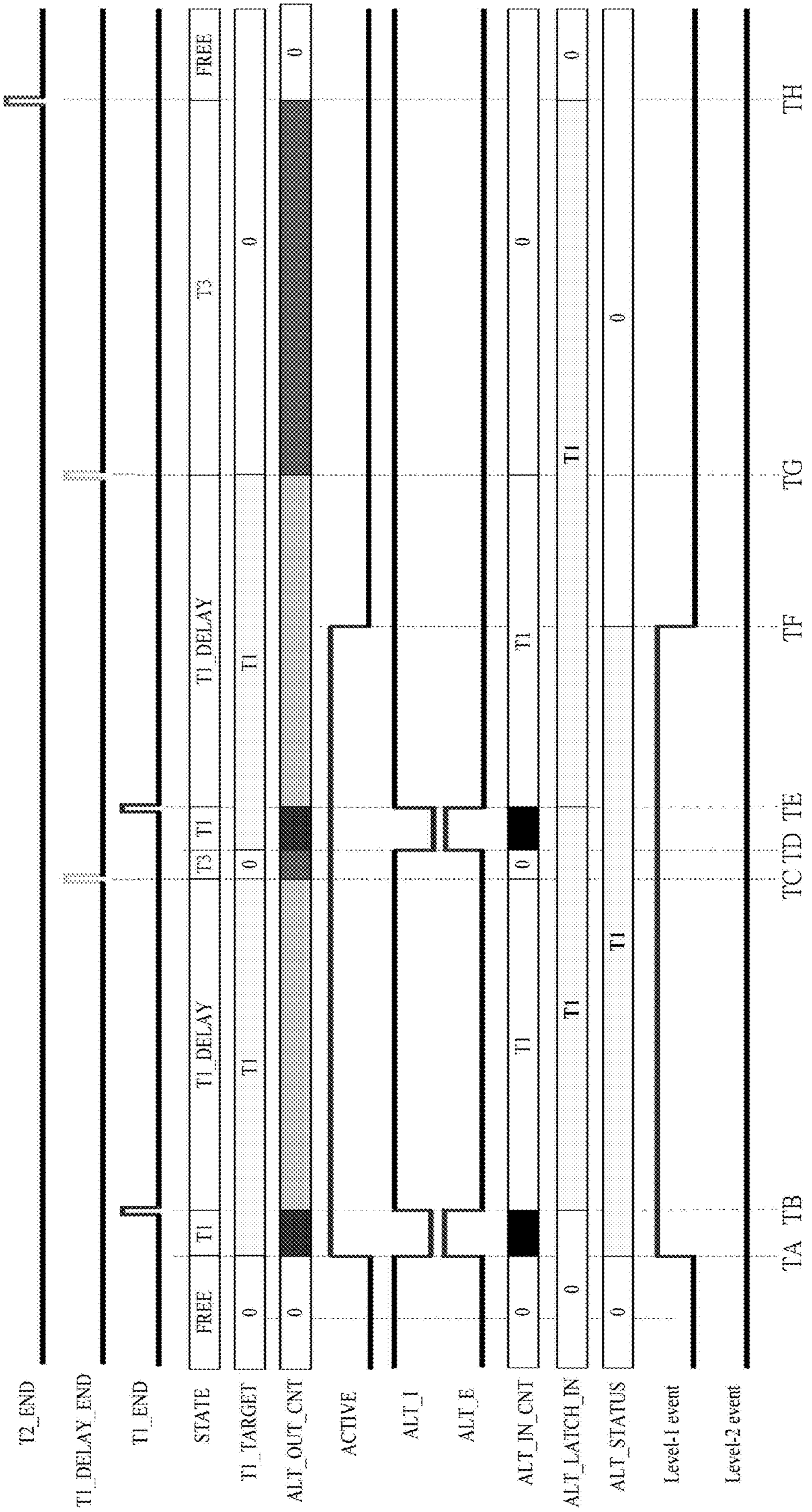
FIGS. 8A and 8B are schematic diagrams illustrating the occurrence of fault conditions in multiple light source driving circuits of the light source drive system provided in one embodiment of the present disclosure.
Figure 8B:
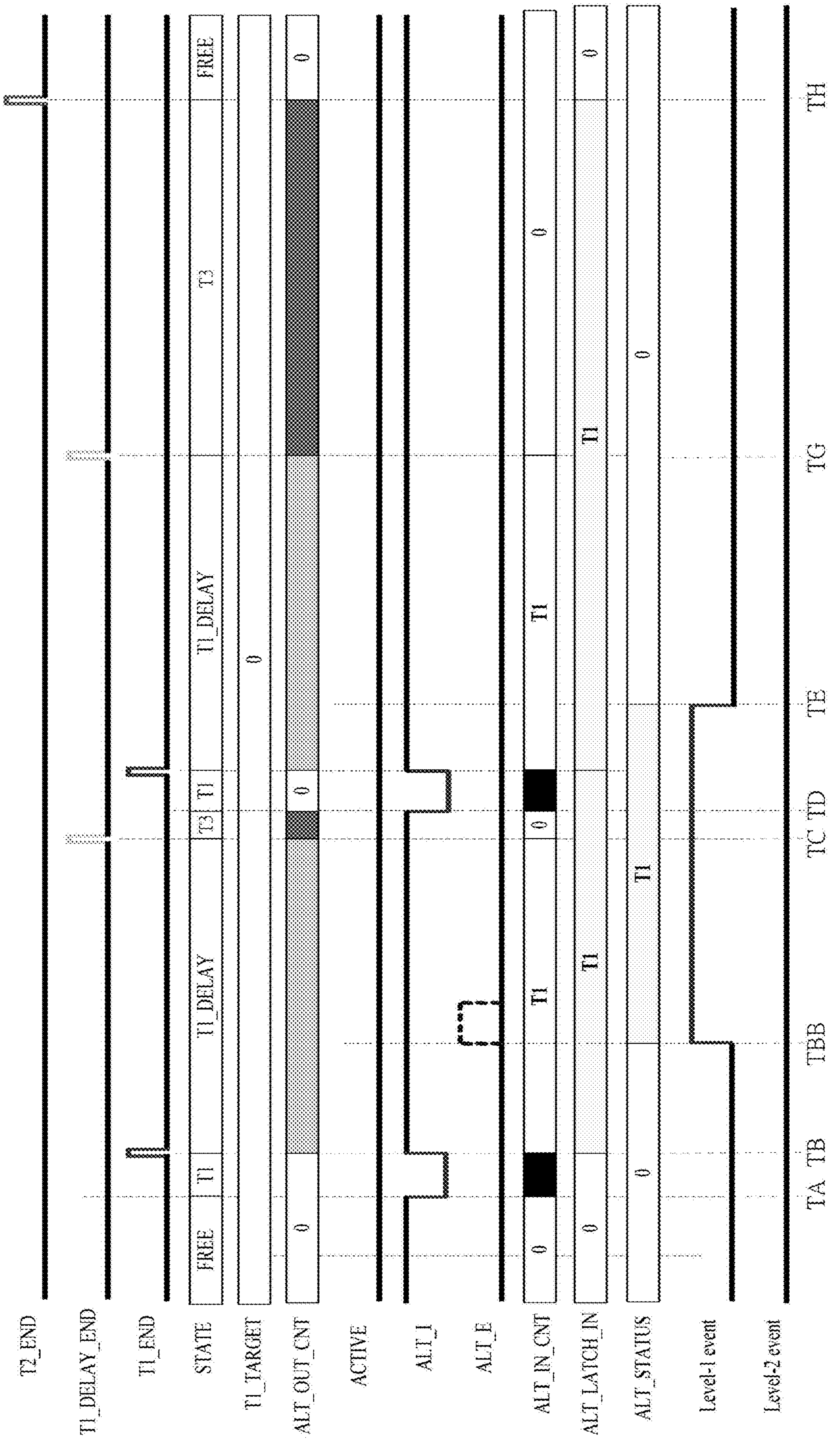

Reference is made to FIGS. 8A and 8B, which illustrate schematic diagrams of multiple light source driving circuits each experiencing fault conditions in the light source driving system according to embodiments of the present disclosure. FIG. 8A shows the relevant control waveform of the first light source driving circuit 21, and FIG. 8B shows the relevant control waveform of the second light source driving circuit 23. The operational mode of the first light source driving circuit 21 in FIG. 8A is the same as that in FIG. 4A, and the control method for the first light source driving circuit 21 can be referred to in the previous descriptions.

As shown in FIG. 8B, for the second light source driving circuit 23, the fault reporting circuit 2211 can determine the occurrence of a first fault message based on the states of the Level-1 event and Level-2 event. Specifically, the Level-1 event remains at a logic high level from time TBB to TE, representing that the second light source driving circuit 23 has encountered a first fault message. However, time TBB falls within the delay time of the working cycle of the first light source driving circuit in FIG. 8A. Since the fault condition of the first light source driving circuit 21 occurred earlier than the fault condition of the second light source driving circuit 23, the second light source driving circuit 23 cannot acquire the control authority of the fault transmission line ALT at time TBB. Instead, as shown in FIG. 8A, the first light source driving circuit 21 has control authority of the fault transmission line ALT from time TA to TF.

Figure 9A:
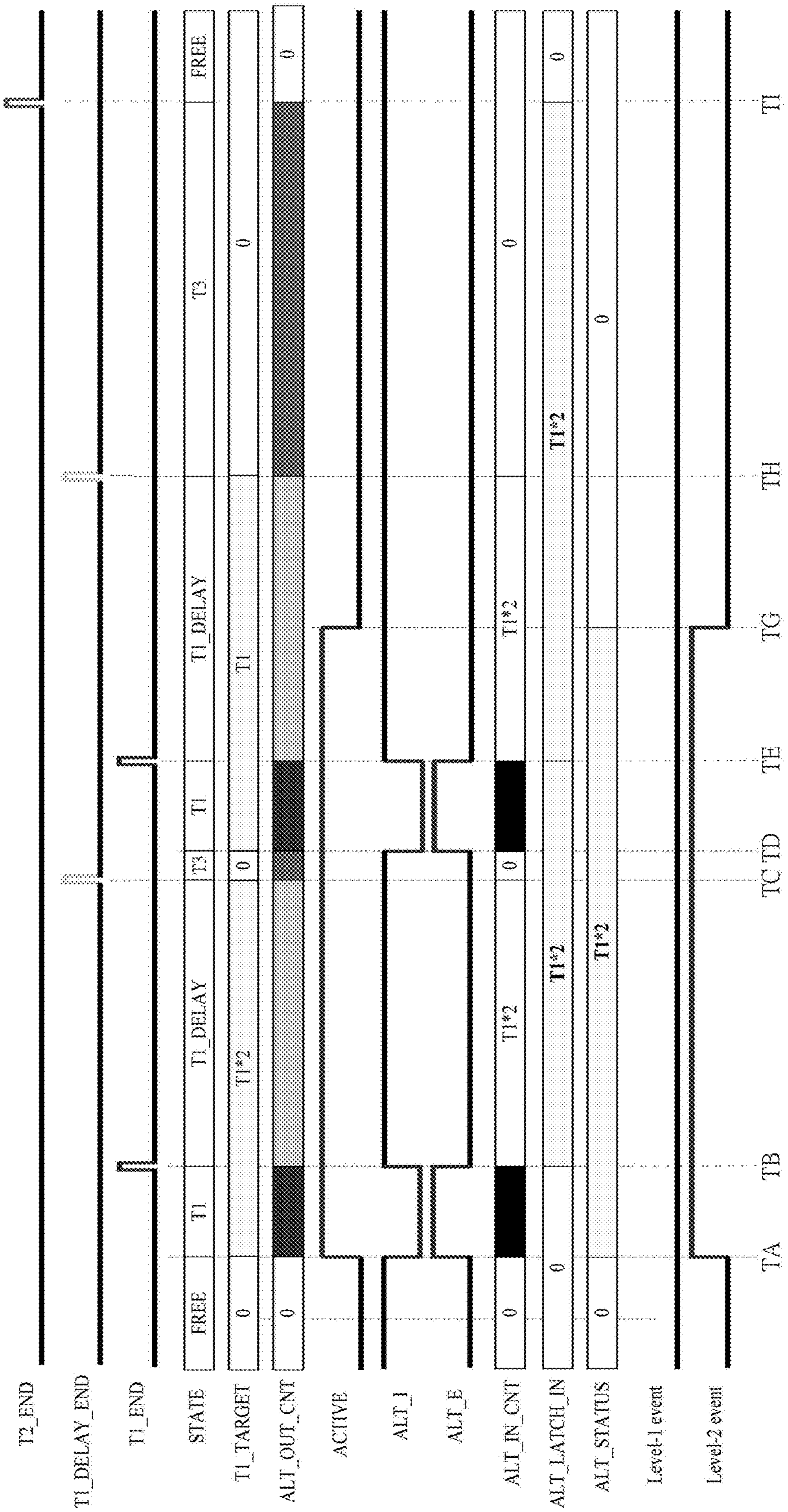
FIGS. 9A and 9B are schematic diagrams illustrating the occurrence of fault conditions in multiple light source driving circuits of the light source drive system provided in one embodiment of the present disclosure.
Figure 9B:
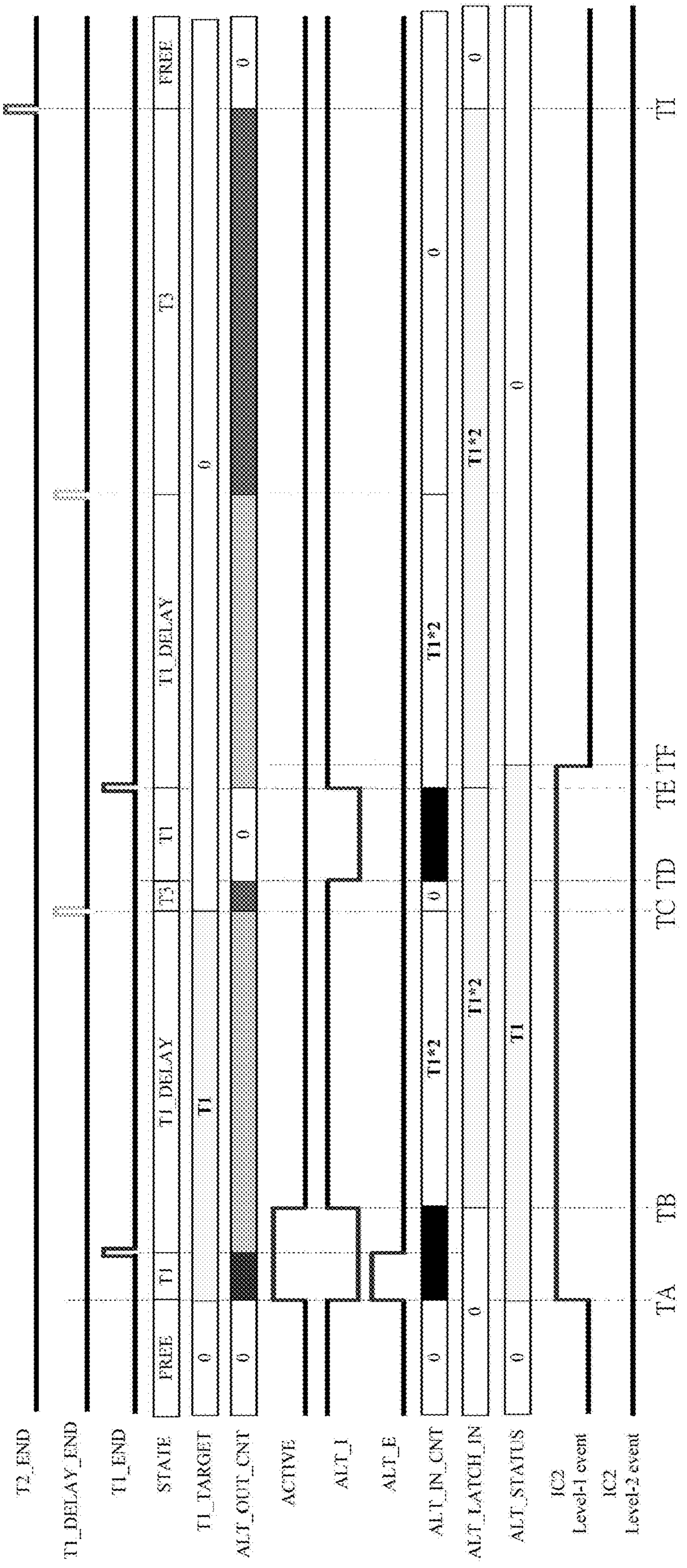

Reference is made to FIGS. 9A and 9B, which illustrate schematic diagrams of multiple light source driving circuits each experiencing fault conditions in the light source driving system according to embodiments of the present disclosure. FIG. 9A shows the relevant control waveform of the first light source driving circuit 21, and FIG. 9B shows the relevant control waveform of the second light source driving circuit 23. The operational mode of the first light source driving circuit 21 in FIG. 9A is the same as that in FIG. 5A, and the control method for the first light source driving circuit 21 can be referred to in the previous descriptions.

As shown in FIG. 9B, for the second light source driving circuit 23, the fault reporting circuit 2211 can determine the occurrence of a first fault message based on the states of the Level-1 event and Level-2 event. Specifically, the Level-1 event remains at a logic high level from time TA to TE, representing that the second light source driving circuit 23 has encountered a first fault message. However, at time TA in FIGS. 9A and 9B, both the first light source driving circuit 21 and the second light source driving circuit 23 experience fault conditions simultaneously. Nevertheless, since the fault condition of the first light source driving circuit 21 corresponds to a second fault message, which has a higher priority than the first fault message of the second light source driving circuit 23, the first light source driving circuit 21 has priority.

For example, as shown in FIG. 9B, for the second light source driving circuit 23, the fault control circuit 2210 can initiate the counting of the working cycle (T2) at time TA. During this period, the fault control circuit 2210 uses the output switch control signal (ALT_E) to control the switch 223, with the detection time set to the first detection time (T1). In FIG. 9B, the switch 223 of the second light source driving circuit 23 is turned on according to the switch control signal (ALT_E) from time TA to TAA, and this conduction time corresponds to the first detection time (T1). Additionally, the detection circuit 2212 detects that the level of ALT_I remains at the first level (logic low level) for the first level time, which occurs between time TA and TB and is greater than the first detection time (T1). From this, it can be understood that the first level time is greater than the first detection time (T1). Therefore, the second light source driving circuit 23 cannot acquire the control authority of the fault transmission line ALT, as shown by the ACTIVE remaining at a logic low level after time TB in FIG. 9B.

Figure 10A:
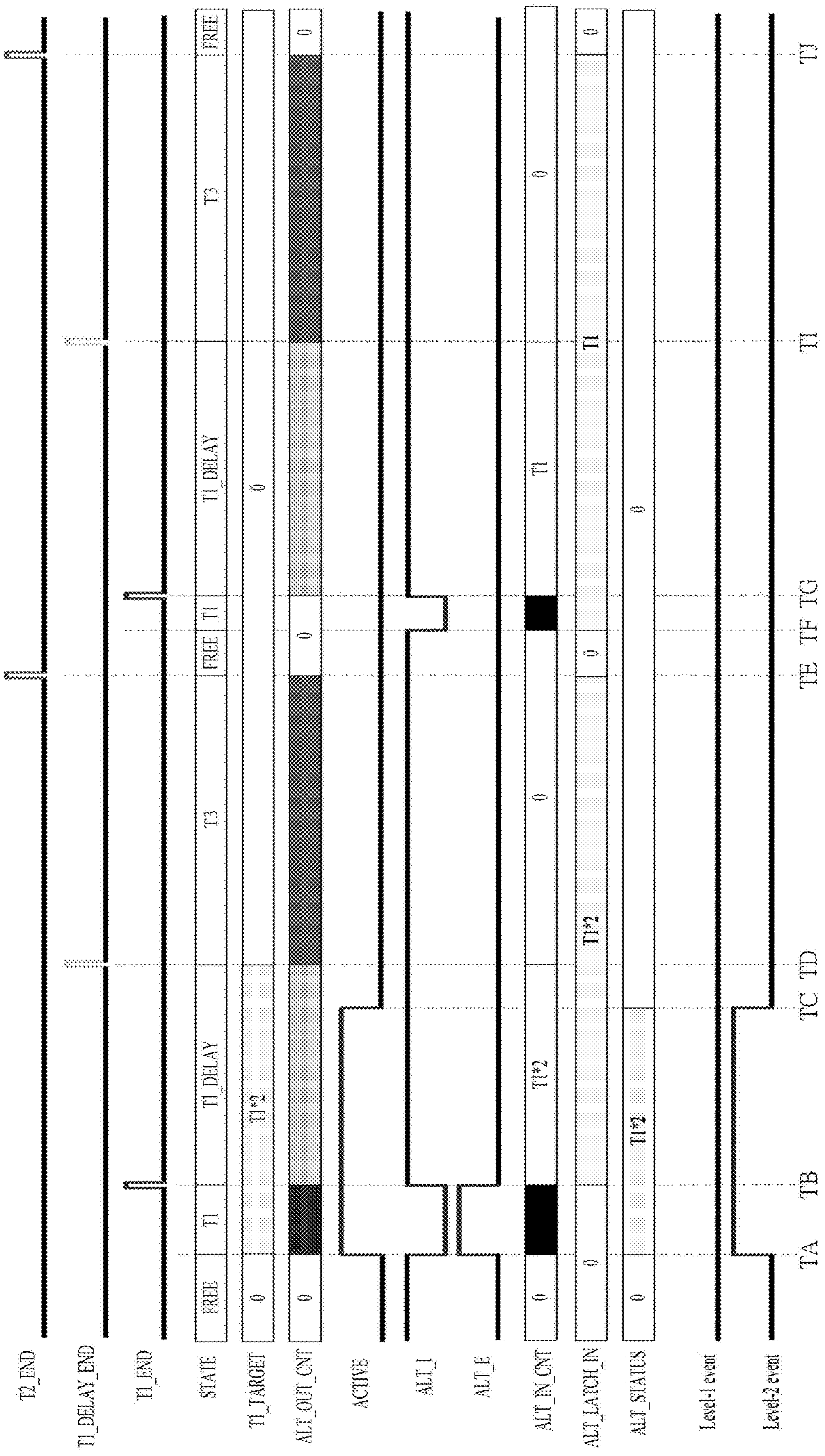
FIGS. 10A and 10B are schematic diagrams illustrating the occurrence of fault conditions in multiple light source driving circuits of the light source drive system provided in one embodiment of the present disclosure.
Figure 10B:
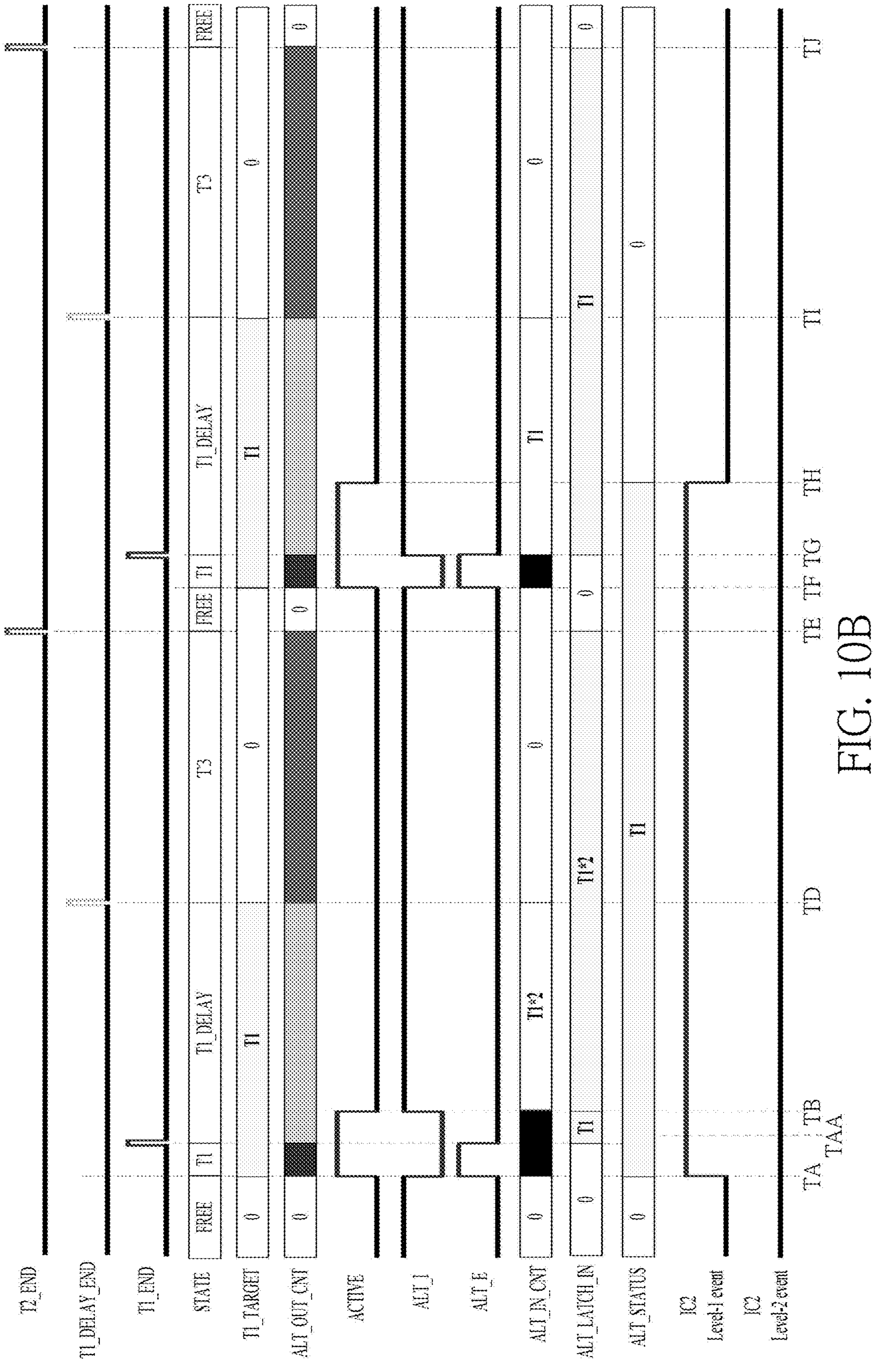

Reference is made to FIGS. 10A and 10B, which illustrate schematic diagrams of multiple light source driving circuits each experiencing fault conditions in the light source driving system according to embodiments of the present disclosure. FIG. 10A shows the relevant control waveform of the first light source driving circuit 21, and FIG. 10B shows the relevant control waveform of the second light source driving circuit 23.

As shown in FIGS. 10A and 10B, the first light source driving circuit 21 generates a second fault message at time TA, and the second light source driving circuit 23 generates a first fault message at time TA. This means that both the first light source driving circuit 21 and the second light source driving circuit 23 encounter fault conditions simultaneously. However, the second fault message from the first light source driving circuit 21 has a higher priority compared to the first fault message from the second light source driving circuit 23.

Furthermore, as shown in FIG. 10A, for the first light source driving circuit 21, the fault control circuit 2210 can initiate the counting of the working cycle (T2) at time TA. During this period, the fault control circuit 2210 uses the output switch control signal (ALT_E) to control the switch 223, setting the detection time to the second detection time (T1*2). In FIG. 10A, the switch 223 of the first light source driving circuit 21 is turned on according to the switch control signal (ALT_E) from time TA to TB, and this conduction time corresponds to the second detection time (T1*2). Additionally, the detection circuit 2212 detects that the level of ALT_I remains at the first level (logic low level) for the first level time, which occurs between time TA and TB and is equal to the second detection time (T1*2). From this, it can be understood that the first level time does not exceed the second detection time (T1*2). Therefore, the first light source driving circuit 21 acquires the control authority of the fault transmission line ALT, as indicated by the ACTIVE being at a logic high level from time TA to TC in FIG. 10A.

Conversely, as shown in FIG. 10B, for the second light source driving circuit 23, the fault control circuit 2210 can initiate the counting of the working cycle (T2) at time TA. During this period, the fault control circuit 2210 uses the output switch control signal (ALT_E) to control the switch 223, setting the detection time to the first detection time (T1). In FIG. 10B, the switch 223 of the second light source driving circuit 23 is turned on according to the switch control signal (ALT_E) from time TA to TAA, and this conduction time corresponds to the first detection time (T1). Additionally, the detection circuit detects that the level of ALT_I remains at the first level (logic low level) for the first level time, which occurs between time TA and TB and exceeds the first detection time (T1). From this, it can be understood that the first level time exceeds the first detection time (T1). Therefore, the second light source driving circuit 23 cannot acquire the control authority of the fault transmission line ALT, as indicated by the ACTIVE being at a logic low level after time TB in FIG. 10B.

Continuing with FIG. 10A, the first fault message of the first light source driving circuit 21 is resolved after time TC. That is, the working cycle of the first light source driving circuit 21 from time TA to TD ends. After a waiting time T3, i.e., from time TD to TE, the control authority of the fault transmission line ALT is released at time TF, making it available for other light source driving circuits to use.

As shown in FIG. 10B, at time TF, the second light source driving circuit 23 determines the occurrence of a first fault message, while the first light source driving circuit 21 does not encounter any fault conditions at the same time. Therefore, the fault control circuit 2210 of the second light source driving circuit 23 can initiate the counting of the working cycle (T2) at time TF. During this period, the fault control circuit 2210 uses the output switch control signal (ALT_E) to control the switch 223, setting the detection time to the first detection time (T1). In FIG. 10B, the switch 223 of the second light source driving circuit 23 is turned on according to the switch control signal (ALT_E) from time TF to TG, and this conduction time corresponds to the first detection time (T1). Additionally, the detection circuit 2212 detects that the level of ALT_I remains at the first level (logic low level) for the first level time, which occurs between time TF and TG and is equal to the first detection time (T1). From this, it can be understood that the first level time detected by the second light source driving circuit 23 does not exceed the first detection time (T1). Therefore, the second light source driving circuit 23 acquires the control authority of the fault transmission line ALT, as indicated by the ACTIVE being at a logic high level from time TF to TH in FIG. 10B.

In one embodiment, the control circuit 10 and the fault arbitration circuit 22 can be implemented as an Application-Specific Integrated Circuit (ASIC), a Field-Programmable Gate Array (FPGA), or a System-on-Chip (SOC), individually or in any combination. These may work in conjunction with other relevant circuit components and firmware to implement the above-described control processes.

Beneficial Effects of the Embodiments

The light source driving system and the failure reporting method thereof provided by the present disclosure utilize a fault arbitration circuit configured in each light source driving circuit. This eliminates the need for a power control circuit of the light source driving circuits, thereby effectively simplifying the circuit architecture of the light source driving circuits. Furthermore, each light source driving circuit can report various fault conditions through the fault arbitration circuit via a single fault transmission line. This allows the control circuit to identify the different fault conditions occurring in the respective light source driving circuits and execute subsequent control operations to resolve the fault conditions encountered by the light source driving circuits.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light source drive system, comprising:

a control circuit; and a drive circuit module having at least one light source driving circuit, wherein the light source driving circuit is connected to the control circuit through a fault transmission line for the control circuit to acquire a transmission content of the fault transmission line;

wherein the light source driving circuit comprises a fault arbitration circuit, which includes:

a detection circuit configured to detect a first level time during which the fault transmission line remains at a first level;

a fault reporting circuit configured to output a corresponding fault message according to a fault condition;

a switch connected to the fault transmission line, wherein the switch controls the fault transmission line to be at the first level when the switch is on and controls the fault transmission line to be at a second level when the switch is off; and a fault control circuit configured to initiate a counting duty cycle when the fault condition occurs, the duty cycle including a detection time and a delay time, wherein the fault control circuit controls the switch to be on during the detection time and off during the delay time, and controls the detection circuit to detect the first level during the duty cycle;

wherein the fault control circuit outputs the detection time of different durations according to different types of fault conditions.

2. The light source drive system according to claim 1, wherein the fault message includes a first fault message and a second fault message, the fault control circuit controls a duration of the detection time to be a first detection time based on the first fault message, and controls a duration of the detection time to be a second detection time based on the second fault message, the duration of the second detection time being greater than the duration of the first detection time; and wherein the control circuit determines that the light source driving circuit generates the first fault message when the first level time equals the first detection time, and determines that the light source driving circuit generates the second fault message when the first level time equals the second detection time.

3. The light source drive system according to claim 2, wherein the fault message further includes a third fault message, the third fault message simultaneously includes the first fault message and the second fault message, the fault control circuit controls a duration of the detection time to be a third detection time based on the third fault message, the duration of the third detection time being greater than the duration of the second detection time; and wherein the control circuit determines that the light source driving circuit generates the third fault message when the first level time equals the third detection time.

4. The light source drive system according to claim 2, wherein the first fault message indicates a power shortage, and the second fault message indicates a short circuit warning, an over-temperature warning, or an over-power warning.

5. The light source drive system according to claim 4, wherein the control circuit, upon determining that the light source driving circuit generates the first fault message, controls a power conversion circuit that provides a supply voltage to the light source driving circuit to perform a voltage boost; and wherein the control circuit, upon determining that the light source driving circuit generates the second fault message, reads a register in the light source driving circuit to acquire a content of the second fault message.

6. The light source drive system according to claim 5, wherein the fault control circuit calculates the delay time based on the duty cycle and the detection time, wherein the delay time is time of the duty cycle minus the detection time.

7. A light source drive system, comprising:

a control circuit; and a drive circuit module having a first light source driving circuit and a second light source driving circuit, wherein the first light source driving circuit and the second light source driving circuit are connected to the control circuit via a fault transmission line, so as to enable the control circuit to acquire a transmission content of the fault transmission line;

wherein the first light source driving circuit and the second light source driving circuit respectively comprise a fault arbitration circuit, which includes:

a detection circuit configured to detect a first level time during which the fault transmission line remains at a first level;

a fault reporting circuit, configured to output a corresponding fault message based on a fault condition;

a switch connected to the fault transmission line, wherein the switch controls the fault transmission line to be at the first level when the switch is on and controls the fault transmission line to be at a second level when the switch is off; and a fault control circuit configured to initiate a counting duty cycle when the fault condition occurs, wherein the duty cycle includes a detection time and a delay time, the fault control circuit controls the switch to be on during the detection time and off during the delay time, and controls the detection circuit to detect the first level during the duty cycle;

wherein the fault control circuit outputs the detection time of different durations corresponding to different types of fault conditions, and determines a control authority of the fault transmission line based on the first level time and the detection time.

8. The light source drive system according to claim 7, wherein the fault message includes a first fault message and a second fault message, the fault control circuit controls a duration of the detection time to be a first detection time based on the first fault message, and controls a duration of the detection time to be a second detection time based on the second fault message, the duration of the second detection time being greater than the duration of the first detection time, and wherein the control circuit determines that the first light source driving circuit or the second light source driving circuit generates the first fault message when the first level time equals the first detection time, and determines that the first light source driving circuit or the second light source driving circuit generates the second fault message when the first level time equals the second detection time.

9. The light source drive system according to claim 8, wherein the fault message further includes a third fault message, the third fault message comprises both the first fault message and the second fault message, the fault control circuit controls the duration of the detection time to be a third detection time based on the third fault message, wherein a duration of the third detection time is greater than the duration of the second detection time, and the control circuit determines that the first light source driving circuit or the second light source driving circuit generates the third fault message when the first level time equals the third detection time.

10. The light source drive system according to claim 8, wherein, when the first light source driving circuit generates the fault condition and the second light source driving circuit does not generate the fault condition, the fault control circuit of the first light source driving circuit determines that the first level time does not exceed the detection time, the first light source driving circuit acquires a control authority of the fault transmission line, and the control circuit identifies types of fault conditions based on the first level time of the fault transmission line.

11. The light source drive system according to claim 10, wherein, after the first light source driving circuit and the second light source driving circuit complete the duty cycle, the first light source driving circuit and the second light source driving circuit determine a next duty cycle after a waiting time.

12. The light source drive system according to claim 11, wherein, when the first light source driving circuit or the second light source driving circuit generates another fault condition during the delay time of the duty cycle, the first light source driving circuit or the second light source driving circuit halts an execution of another duty cycle.

13. The light source drive system according to claim 12, wherein, when both the first light source driving circuit and the second light source driving circuit generate the fault condition, the fault control circuit of the first light source driving circuit determines that the fault message is the first fault message, the fault control circuit of the second light source driving circuit determines that the fault message is the second fault message, and when the first level time is greater than the first detection time but does not exceed the second detection time, the second light source driving circuit acquires a control authority of the fault transmission line, and the control circuit identifies types of fault conditions based on the first level time of the fault transmission line.

14. The light source drive system according to claim 10, wherein, when the first light source driving circuit and the second light source driving circuit sequentially generate the fault condition, the fault control circuit of the first light source driving circuit determines that the first level time does not exceed the detection time, the first light source driving circuit acquires a control authority of the fault transmission line, and the control circuit identifies types of fault conditions based on the first level time of the fault transmission line.

15. The light source drive system according to claim 8, wherein the first fault message indicates an insufficient power, and the second fault message is a short-circuit detection warning, an over-temperature warning, or an over-power warning.

16. The light source drive system according to claim 8, wherein, when the control circuit determines that the first light source driving circuit or the second light source driving circuit generates the first fault message, the control circuit controls a power conversion circuit to provide a supply voltage to the first light source driving circuit and the second light source driving circuit to boost the voltage, and when the control circuit determines that the first light source driving circuit or the second light source driving circuit generates the second fault message, the control circuit reads a register in the first light source driving circuit and the second light source driving circuit to acquire a content of the second fault message.

17. A failure reporting method of a light source drive system, comprising:

when a fault condition occurs in a first light source driving circuit or a second light source driving circuit, initiating a duty cycle in fault arbitration circuits of the first light source driving circuit and the second light source driving circuit, respectively, wherein the first light source driving circuit and the second light source driving circuit are connected to a control circuit through a fault transmission line, so as to enable the control circuit to acquire a transmission content of the fault transmission line, wherein the duty cycle comprises a detection time and a delay time; controlling a switch in a fault control circuit of the fault arbitration circuit to be on during the detection time and off during the delay time, wherein the switch controls the fault transmission line to be at a first level when on and controls the fault transmission line to be at a second level when off, and controlling a detection circuit to detect a first level time during which the fault transmission line is maintained at the first level within the duty cycle; and outputting different detection times of varying durations according to types of fault conditions, wherein the fault control circuit determines a control authority of the fault transmission line based on the first level time and the detection time.

18. The failure reporting method of a light source drive system according to claim 17, further comprising:

when the fault message includes a first fault message, controlling a duration of the detection time to be a first detection time based on the first fault message;

when the fault message includes a second fault message, controlling a duration of the detection time to be a second detection time based on the second fault message, wherein the duration of the second detection time is greater than the duration of the first detection time;

when the fault message includes a third fault message, controlling a duration of the detection time to be a third detection time based on the third fault message, wherein the duration of the third detection time is greater than the second detection time; and determining that the first light source driving circuit or the second light source driving circuit generates the first fault message when the first level time equals the first detection time, determining that the first light source driving circuit or the second light source driving circuit generates the second fault message when the first level time equals the second detection time, and determining that the first light source driving circuit or the second light source driving circuit generates the third fault message when the first level time equals the third detection time.

19. The failure reporting method of a light source drive system according to claim 18, further comprising:

when the first light source driving circuit generates the fault condition and the second light source driving circuit does not generate the fault condition, the fault control circuit of the first light source driving circuit determining that the first level time does not exceed the detection time, so as to enable the first light source driving circuit to acquire a control authority of the fault transmission line;

when the first light source driving circuit or the second light source driving circuit generates another fault condition during the delay time of the duty cycle, halting an execution of another duty cycle;

when both the first light source driving circuit and the second light source driving circuit simultaneously generate the fault condition, and the fault control circuit of the first light source driving circuit determines that the fault message is the first fault message while the fault control circuit of the second light source driving circuit determines that the fault message is the second fault message, and when the first level time is greater than the first detection time but does not exceed the second detection time, enabling the second light source driving circuit to acquire a control authority of the fault transmission line; and when the first light source driving circuit and the second light source driving circuit sequentially generate the fault condition, the fault control circuit of the first light source driving circuit determining that the first level time does not exceed the detection time, so as to enable the first light source driving circuit to acquire a control authority of the fault transmission line.

20. The failure reporting method of a light source drive system according to claim 18, further comprising:

when the control circuit determines that the first light source driving circuit or the second light source driving circuit generates the first fault message, controlling a power conversion circuit that provides a supply voltage to the first light source driving circuit and the second light source driving circuit to perform a voltage boost; and when the control circuit determines that the first light source driving circuit or the second light source driving circuit generates the second fault message, the control circuit reading a register in the first light source driving circuit and the second light source driving circuit to acquire a content of the second fault message.

* * * * *